(12) United States Patent
Suzuki et al.

(10) Patent No.: US 9,036,930 B2
(45) Date of Patent: *May 19, 2015

(54) IMAGE SIGNAL DECODING APPARATUS AND IMAGE SIGNAL DECODING METHOD

(71) Applicant: SONY CORPORATION, Tokyo (JP)

(72) Inventors: Teruhiko Suzuki, Kanagawa (JP); Shinobu Hattori, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/924,117

(22) Filed: Jun. 21, 2013

(65) Prior Publication Data
US 2013/0279601 A1    Oct. 24, 2013

Related U.S. Application Data

(63) Continuation of application No. 13/687,890, filed on Nov. 28, 2012, now Pat. No. 8,503,804, which is a continuation of application No. 12/993,400, filed as application No. PCT/JP2010/055271 on Mar. 25, 2010, now Pat. No. 8,472,731.

(30) Foreign Application Priority Data

Apr. 3, 2009  (JP) ................. 2009-091245

(51) Int. Cl.
*G06K 9/46*    (2006.01)
*G06T 9/00*    (2006.01)
(Continued)

(52) U.S. Cl.
CPC .............. *G06T 9/007* (2013.01); *H04N 19/597* (2014.01); *H04N 19/70* (2014.01); *H04N 19/172* (2014.01);
(Continued)

(58) Field of Classification Search
CPC ............. G06T 9/007; H04N 19/00006; H04N 19/0009; H04N 19/00193; H04N 19/00266; H04N 19/00327; H04N 19/00769; H04N 19/00781; H04N 19/00884; H04N 19/00533
USPC ........ 382/232, 233, 244, 245, 246, 248, 250, 382/251, 305; 348/42, 43, 54, 51; 386/108, 386/230, 239, 241, 337
See application file for complete search history.

(56) References Cited

U.S. PATENT DOCUMENTS 8,208,790 B2    6/2012  Toma et al.
8,270,807 B2    9/2012  Sasaki et al.
(Continued)

FOREIGN PATENT DOCUMENTS

CN    1741619 A        3/2006
EP    1 689 193 A1    8/2006
(Continued)

OTHER PUBLICATIONS

Extended Search Report issued Jun. 18, 2013 in European Patent Application No. 13163145.9.
(Continued)

*Primary Examiner* — Ali Bayat
(74) *Attorney, Agent, or Firm* — Oblon, McClelland, Maier & Neustadt, L.L.P.

(57) ABSTRACT

A decoding method decodes a base stream generated by encoding a first image signal of a first view and a dependent stream generated by encoding a second image signal of a second view. The method including detecting, on the basis of a dependant delimiter indicating a picture boundary between pictures in the dependant stream, the picture boundary in the dependent stream configured by inserting the dependent delimiter at the beginning of a picture in the dependent stream. Further, the method includes decoding the base stream and the dependent stream on the basis of the detected picture boundary in the dependent stream.

3 Claims, 32 Drawing Sheets

(51) Int. Cl.
*H04N 19/597* (2014.01)
*H04N 19/70* (2014.01)
*H04N 19/44* (2014.01)
H04N 19/172 (2014.01)
H04N 19/61 (2014.01)
H04N 19/124 (2014.01)
H04N 19/152 (2014.01)
H04N 19/169 (2014.01)
H04N 19/10 (2014.01)

(52) U.S. Cl.
CPC .............. *H04N 19/61* (2014.01); *H04N 19/124* (2014.01); *H04N 19/152* (2014.01); *H04N 19/44* (2014.01); *H04N 19/188* (2014.01); *H04N 19/10* (2014.01)

(56) References Cited

U.S. PATENT DOCUMENTS

| | | | |
|---|---|---|---|
| 8,503,804 B2 * | 8/2013 | Suzuki et al. | 382/233 |
| 2003/0095177 A1 | 5/2003 | Yun et al. | |
| 2005/0244050 A1 | 11/2005 | Nomura et al. | |
| 2006/0013297 A1 | 1/2006 | Suzuki et al. | |
| 2006/0171600 A1 | 8/2006 | Kikuchi | |
| 2007/0104277 A1 | 5/2007 | Kikuchi | |
| 2007/0104278 A1 | 5/2007 | Kikuchi | |
| 2007/0104453 A1 | 5/2007 | Kikuchi | |
| 2007/0104454 A1 | 5/2007 | Kikuchi | |
| 2007/0104455 A1 | 5/2007 | Kikuchi | |
| 2010/0091881 A1 | 4/2010 | Pandit et al. | |
| 2010/0215347 A1 * | 8/2010 | Ikeda et al. | 386/108 |
| 2010/0232767 A1 | 9/2010 | Sasaki et al. | |
| 2010/0254679 A1 * | 10/2010 | Sasaki et al. | 386/108 |

FOREIGN PATENT DOCUMENTS

| | | |
|---|---|---|
| JP | 7-050855 | 2/1995 |
| JP | 2004-240469 | 8/2004 |
| JP | 2006-054500 | 2/2006 |
| JP | 2007-208917 | 8/2007 |
| JP | 2009-004940 | 1/2009 |
| WO | WO 03/092303 A1 | 11/2003 |
| WO | WO 03/092304 | 11/2003 |
| WO | WO 2007/010779 A1 | 1/2007 |
| WO | WO 2007/114608 | 10/2007 |
| WO | WO 2008/088497 A2 | 7/2008 |
| WO | WO 2009/133714 | 11/2009 |
| WO | WO 2010/064472 A1 | 6/2010 |

OTHER PUBLICATIONS

Extended Search Report issued Jun. 20, 2013 in European Patent Application No. 13163138.4.

Extended Search Report issued Jul. 9, 2013 in European Patent Application No. 13163141.8.

Anthony Vetro, "Joint Draft 7.0 on Multiview Video Coding", Output Document of JVT, Joint Video Team (JVT) of ISO/IEC MPEG & ITU-T VCEG (ISO/IEC JTC1/SC29/WG11 and ITU-T SG16 Q.6), Document: JVT-AA209, Filename: JVT-AA209.doc, XP030007391, 55 pages.

Peter Amon, et al., "File Format for Scalable Video Coding", IEEE Transactions on Circuits and Systems for Video Technology, vol. 17, No. 9, Sep. 2007, XP 011193013, pp. 1174-1185.

Emin Martinian, et al., "Extensions of H.264/AVC for Multiview Video Compression", Image Processing, 2006 IEEE International Conference on, IEEE, PI, Oct. 1, 2006, XP031049303, pp. 2981-2984.

Teruhiko Suzuki, "Proposal to Detect Dependent View Boundary in MVC", Motion Picture Expert Group or ISO/IEC JTC1/SC29/WG11, No. M16366, Apr. 2009, XP030044963, 3 pages.

International Search Report issued Jun. 22, 2010, in PCT/JP10/055271 filed Mar. 25, 2010.

Japanese Office Action issued Dec. 27, 2011, in Patent Application No. 2009-091245 with English Translation.

Japanese Office Action issued Mar. 1, 2012, in Patent Application No. 2012-013958.

Extended European Search Report mailed Jan. 30, 2013, in European Patent Application No. 10758543.2.

Aljoscha, Smolic, et al., "Development of a new MPEG Standard for Advanced 3D Video Applications", Proceedings of the 6$^{th}$ International Symposium on Image and Signal Processing and Analysis (2009), IEEE, Piscataway, NJ, USA, Sep. 16, 2009, pp. 400-407, XP31552049A.

Christian Bartnik., et al., "HEVC Extension for Multiview Video Coding and Multiview Video plus Depth Coding", 43. VCEG Meeting, 97. MPEG Meeting, Jul. 17, 2011-Jul. 22, 2011, Torino, Video Coding Experts Group of ITU-T SG. 16, No. VCEGAR13, Feb. 4, 2012, XP30003856A.

Purvin Pandit, et al., "Comments on High-Level syntax for MVC", 76. MPEG Meeting; Mar. 4, 2006-Jul. 4, 2006; Montreux, Motion Pictureexpert Group or ISO/IEC JTC1/SC29/WG11, No. M13319, Mar. 30, 2006, XP30041988A.

Combined Chinese Office Action and Search Report issued Jun. 28, 2013, Chinese Patent Application No. 201080001692.1 with English translation.

* cited by examiner

FIG. 18

| nal_unit(NumBytesInNALunit) { | C | Descriptor |
|---|---|---|
|   forbidden_zero_bit | All | f(1) |
|   nal_ref_idc | All | u(2) |
|   nal_unit_type | All | u(5) |
|   NumBytesInRBSP = 0 | | |
|   nalUnitHeaderBytes = 1 | | |
|   if(nal_unit_type == 14 || nal_unit_type == 20) { | | |
|     svc_extension_flag | All | u(1) |
|     if(svc_extension_flag) | | |
|       nal_unit_header_svc_extension( ) /* specified in Annex G */ | All | |
|     else | | |
|       nal_unit_header_mvc_extension( ) /* specified in Annex H */ | All | |
|     nalUnitHeaderBytes+=3 | | |
|   } | | |
|   for(i = nalUnitHeaderBytes; i<NumBytesInNALunit; i++) { | | |
|     if(i+2<NumBytesInNALunit && next_bits(24) == 0x000003) { | | |
|       rbsp_byte[NumBytesInRBSP++] | All | b(8) |
|       rbsp_byte[NumBytesInRBSP++] | All | b(8) |
|       i+=2 | | |
|       emulation_prevention_three_byte /* equal to 0x03 */ | All | f(8) |
|     }else | | |
|       rbsp_byte[NumBytesInRBSP++] | All | b(8) |
|   } | | |
| } | | |

FIG. 19

| nal_unit_type | Content of NAL unit and RBSP syntax structure | C | Annex A NAL unit type class | Annex G and Annex H NAL unit type class |
|---|---|---|---|---|
| 0 | Unspecified | | non-VCL | non-VCL |
| 1 | Coded slice of a non-IDR picture slice_layer_without_partitioning_rbsp( ) | 2, 3, 4 | VCL | VCL |
| 2 | Coded slice data partition A slice_data_partition_a_layer_rbsp( ) | 2 | VCL | not applicable |
| 3 | Coded slice data partition B slice_data_partition_b_layer_rbsp( ) | 3 | VCL | not applicable |
| 4 | Coded slice data partition C slice_data_partition_c_layer_rbsp( ) | 4 | VCL | not applicable |
| 5 | Coded slice of an IDR picture slice_layer_without_partitioning_rbsp( ) | 2, 3 | VCL | VCL |
| 6 | Supplemental enhancement information (SEI) sei_rbsp( ) | 5 | non-VCL | non-VCL |
| 7 | Sequence parameter set seq_parameter_set_rbsp( ) | 0 | non-VCL | non-VCL |
| 8 | Picture parameter set pic_parameter_set_rbsp( ) | 1 | non-VCL | non-VCL |
| 9 | Access unit delimiter access_unit_delimiter_rbsp( ) | 6 | non-VCL | non-VCL |
| 10 | End of sequence end_of_seq_rbsp( ) | 7 | non-VCL | non-VCL |
| 11 | End of stream end_of_stream_rbsp( ) | 8 | non-VCL | non-VCL |
| 12 | Filler data filler_data_rbsp( ) | 9 | non-VCL | non-VCL |

FIG. 20

| nal_unit_type | Content of NAL unit and RBSP syntax structure | C | Annex A NAL unit type class | Annex G and Annex H NAL unit type class |
|---|---|---|---|---|
| 13 | Sequence parameter set extension seq_parameter_set_extension_rbsp( ) | 10 | non-VCL | non-VCL |
| 14 | Prefix NAL unit prefix_nal_unit_rbsp( ) | 2 | non-VCL | suffix dependent |
| 15 | Subset sequence parameter set subset_seq_parameter_set_rbsp( ) | 0 | non-VCL | non-VCL |
| 16..17 | Reserved | | non-VCL | non-VCL |
| 18 | Dependent delimiter dependent_delimiter_rbsp( ) | | non-VCL | non-VCL |
| 19 | Coded slice of an auxiliary coded picture without partitioning slice_layer_without_partitioning_rbsp( ) | 2, 3, 4 | non-VCL | non-VCL |
| 20 | Coded slice extension slice_layer_extension_rbsp( ) | 2, 3, 4 | non-VCL | VCL |
| 21..23 | Reserved | | non-VCL | non-VCL |
| 24..31 | Unspecified | | non-VCL | non-VCL |

FIG. 22

| byte_stream_nal_unit( NumBytesInNALunit ) { | C | Descriptor |
|---|---|---|
| while(next_bits(24) != 0x000001 && next_bits(32) != 0x00000001 ) | | |
|    leading_zero_8bits  /* equal to 0x00 */ | | f(8) |
| if(next_bits(24) != 0x000001 ) | | |
|    zero_byte /* equal to 0x00 */ | | f(8) |
| start_code_prefix_one_3bytes /* equal to 0x000001 */ | | f(24) |
| nal_unit(NumBytesInNALunit) | | |
| while( more_data_in_byte_stream( ) && next_bits(24) != 0x000001 && next_bits(32) != 0x00000001 ) | | |
|    trailing_zero_8bits /* equal to 0x00 */ | | f(8) |
| } | | |

IMAGE SIGNAL DECODING APPARATUS AND IMAGE SIGNAL DECODING METHOD

CROSS-REFERENCE TO RELATED APPLICATIONS

This application is a continuation of U.S. application Ser. No. 13/687,890, filed on Nov. 28, 2012, which is a continuation of U.S. application Ser. No. 12/993,400, filed on Nov. 18, 2010, now U.S. Pat. No. 8,472,731. This application is based upon and claims the benefit of priority to International Application No. PCT/JP2010/055271, filed on Mar. 25, 2010 and from the prior Japanese Patent Application No. 2009-091245 filed on Apr. 3, 2009. The entire contents of each of these documents are incorporated herein by reference.

TECHNICAL FIELD

The present invention relates to an image signal decoding apparatus, an image signal decoding method, an image signal encoding apparatus, an image signal encoding method, and a program, and more specifically, to an image signal decoding apparatus, an image signal decoding method, an image signal encoding apparatus, an image signal encoding method, and a program that allow easy detection of picture boundaries of a Dependent stream on a bit stream.

BACKGROUND ART

In recent years, apparatuses complying with schemes for compression based on an orthogonal transform such as a discrete cosine transform and motion compensation, such as MPEG, by utilizing redundancy specific to image information for the purpose of realizing high-efficiency transmission and accumulation of information have been increasingly prevalent for use in both distribution of information from broadcast stations or the like and receipt of information at general consumer homes.

In particular, MPEG2 (ISO/IEC 13818-2) is defined as a general-purpose image encoding scheme, and is a standard that covers both interlaced scanned images and progressive scanned images as well as standard-definition images and high-definition images, which is now widely used for a wide variety of applications including professional applications and consumer applications.

With the use of MPEG2, a high compression ratio and high quality implementation of images is feasible by, for example, assigning a code rate (bit rate) 4 to 8 Mbps to a standard-definition interlaced scanned image having 720×480 pixels. In addition, a high compression ratio and high quality implementation of images is feasible by assigning a code rate of 18 to 22 Mbps to a high-definition interlaced scanned image having 1920×1088 pixels.

MPEG2 has been intended primarily for high-quality encoding suitable for broadcasting, but has not supported encoding schemes of a lower code rate, that is, a higher compression ratio, than that of MPEG1.

With the increase in popularity of mobile terminals, the demand for such encoding schemes will increase in the future. To meet the demand, the MPEG4 encoding scheme was standardized. As to image encoding schemes, the ISO/IEC 14496-2 standard was approved as an international standard in December 1998.

Furthermore, a standard called H.264/AVC (MPEG-4 part 10, ISO/IEC 14496-10|ITU-T H.264) is also standardized. The standard is developed by an organization named JVT (Joint Video Team) jointly established by ITU-T and ISO/IEC to promote standardization of video encoding.

It is known that H.264/AVC requires a larger amount of computation for its encoding and decoding than conventional encoding schemes such as MPEG2 and MPEG4, but makes a higher encoding efficiency feasible.

[H.264/AVC]

FIG. 1 is a block diagram illustrating an example configuration of an image information encoding apparatus that implements image compression based on an orthogonal transform such as a discrete cosine transform or a Karhunen-Loève transform and motion compensation.

1 denotes an A/D conversion unit, 2 denotes a screen rearrangement buffer, 3 denotes an adder unit, 4 denotes an orthogonal transform unit, 5 denotes a quantization unit, 6 denotes a lossless encoding unit, 7 denotes an accumulation buffer, 8 denotes a dequantization unit, 9 denotes an inverse orthogonal transform unit, 10 denotes a frame memory, 11 denotes a motion prediction/compensation unit, and 12 denotes a rate control unit.

An image signal that is input is first converted into a digital signal by the A/D conversion unit 1.

Then, frames are rearranged by the screen rearrangement buffer 2 in accordance with the GOP (Group of Pictures) structure of image compression information that is output.

For an image to be subjected to intra-encoding, image information about the entire frames is input to the orthogonal transform unit 4, where an orthogonal transform such as a discrete cosine transform or a Karhunen-Loève transform is performed.

A transform coefficient that is the output of the orthogonal transform coefficient 4 is subjected to quantization processing by the quantization unit 5.

A quantized transform coefficient that is the output of the quantization unit 5 is input to the lossless encoding unit 6, where lossless coding such as variable length coding or arithmetic coding is performed. Thereafter, the resulting transform coefficient is accumulated in the accumulation buffer 7, and is output as image compression information. The behavior operation of the quantization unit 5 is controlled by the rate control unit 12.

Simultaneously, the quantized transform coefficient that is the output of the quantization unit 5 is input to the dequantization unit 8, and is in addition subjected to inverse orthogonal transform processing by the inverse orthogonal transform unit 9 into decoded image information. The information is accumulated in the frame memory 10.

An image to be subjected to inter-encoding is first input from the screen rearrangement buffer 2 to the motion prediction/compensation unit 11.

Simultaneously, image information to be referred to is retrieved from the frame memory 10, and is subjected to motion prediction/compensation processing. Reference image information is generated.

The reference image information is sent to the adder unit 3, and is converted here into a difference signal between the reference image information and the image information.

The motion compensation/prediction unit 11 simultaneously outputs motion vector information to the lossless encoding unit 6. The motion vector information is subjected to lossless coding processing such as variable length coding or arithmetic coding, and is inserted in the header portion of the image compression information. Other processing is similar to that for the image compression information to be subjected to intra-encoding.

FIG. 2 is a block diagram illustrating an example configuration of an image information decoding apparatus.

21 denotes an accumulation buffer, 22 denotes a lossless encoding/decoding unit, 23 denotes a dequantization unit, 24 denotes an inverse orthogonal transform unit, 25 denotes an adder unit, 26 denotes a screen rearrangement buffer, 27 denotes a D/A conversion unit, 28 denotes a frame memory, and 29 denotes a motion prediction/compensation unit.

Image compression information (bit stream) that is input is first stored in the accumulation buffer 21, and is thereafter transferred to the lossless encoding/decoding unit 22.

In the lossless encoding/decoding unit 22, processing such as variable length decoding or arithmetic decoding is performed in accordance with a determined image compression information format.

Simultaneously, if the frame is an inter-encoded frame, the lossless encoding/decoding unit 22 also decodes motion vector information stored in the header portion of the image compression information, and outputs the information to the motion prediction/compensation unit 29.

A quantized transform coefficient that is the output of the lossless encoding/decoding unit 22 is input to the dequantization unit 23, and is here output as a transform coefficient.

The transform coefficient is subjected to an inverse orthogonal transform such as an inverse discrete cosine transform or an inverse Karhunen-Loève transform by the inverse orthogonal transform unit 24 in accordance with a determined image compression information format.

In a case where the frame is an intra-encoded frame, image information subjected to inverse orthogonal transform processing is stored in the screen rearrangement buffer 26, and is output after D/A conversion processing.

In a case where the frame is an inter-encoded frame, a reference image is generated based on the motion vector information subjected to lossless decoding process and the image information stored in the frame memory 28. The reference image and the output of the inverse orthogonal transform unit 24 are combined by the adder unit 25. Other processing is similar to that for the intra-encoded frame.

The AVC standard developed by the JVT described previously is a hybrid coding scheme formed of motion compensation and a discrete cosine transform, like MPEG2 or MPEG4.

A discrete cosine transform may be an integer transform approximating a real discrete cosine transform. Although detailed schemes are different such as the transform method of the discrete cosine transform being a method that uses an integer coefficient with a 4×4 block size or the block size in motion compensation being variable, the basic scheme is similar to that of the encoding scheme implemented with the configuration in FIG. 1.

Meanwhile, in recent years, with the advancement of stereoscopic image capture and display technologies, studies on an extension of H.264/AVC to encoding of stereoscopic image signals have been advanced.

Standardization of MVC (Multiview Video Coding) that allows encoding of multi-viewpoint images captured using a plurality of image capture apparatuses is developed.

An image that is assumed to be captured and displayed from two viewpoints is called a stereo image. A naked-eye stereo display is capable of supporting multi-viewpoint display.

While the following description will be given of, mainly, a two-viewpoint stereo image by way of example, application to multi-viewpoint images obtained from three or more viewpoints in a similar manner can be made.

[MVC]

FIG. 3 is a diagram illustrating a multi-viewpoint encoding apparatus.

In a multi-viewpoint encoding apparatus 41, video signals supplied from two image capture apparatuses, that is, image capture apparatuses 31 and 32, are encoded, and bit streams generated by encoding are output. The bit streams composed of data of two-viewpoint images may be multiplexed into a single stream which is output, or may be output as two or more bit streams.

FIG. 4 is a block diagram illustrating an example configuration of the multi-viewpoint encoding apparatus 41 in FIG. 3.

In the multi-viewpoint encoding apparatus 41, a one-viewpoint image among multi-viewpoint images is encoded as a Base stream, and the other images are encoded as Dependent streams.

In the case of a stereo image, one image out of an L image (left-viewpoint image) and an R image (right-viewpoint image) is encoded as a Base stream, and the other image is encoded as a Dependent stream.

The Base stream is a bit stream similar to an existing AVC bit stream encoded using H.264 AVC/High Profile or the like. Therefore, the Base stream becomes a stream that can be decoded using an existing AVC decoder supporting H.264 AVC/High Profile.

Images to be encoded as a Base stream are input to a rearrangement buffer 51, and are rearranged in an order suitable for encoding as I pictures, P pictures, and B pictures. The rearranged images are output to a video encoding unit 52.

The video encoding unit 52 has a similar configuration to the image information encoding apparatus in FIG. 1. In the video encoding unit 52, for example, encoding is performed in compliance with H.264 AVC/High Profile, and a resulting bit stream is output to a multiplexing unit 57. In addition, a local decoded image is saved in a frame memory 53, and is used as a reference image for encoding the next picture or a picture in the Dependent stream.

In the meantime, images to be encoded as a Dependent stream are input to a rearrangement buffer 54, and are rearranged in an order suitable for encoding as I pictures, P pictures, and B pictures. The rearranged images are output to a dependent stream encoding unit 55.

In the dependent stream encoding unit 55, in addition to normal AVC encoding, encoding using, as a reference image, a local decoded image in the Base stream stored in a frame memory 53 is performed, and a bit stream is output to the multiplexing unit 57. In addition, the local decoded image is saved in the frame memory 56, and is used as a reference image for encoding the next picture.

In the multiplexing unit 57, the Base stream and the Dependent stream are multiplexed into a single bit stream which is output. The Base stream and the Dependent stream may be output as separate bit streams.

FIG. 5 is a diagram illustrating an example of an MVC reference image.

A Base stream is encoded by performing only prediction in the time direction in a manner similar to that in normal AVC.

A Dependent stream is encoded by performing, in addition to prediction in the time direction within a same-viewpoint image, which is similar to that in normal AVC, prediction using an image in the Base stream that is obtained at the same time point as a reference image. Even in a case where prediction in the time direction cannot be suitably performed, the capability of referring to an other-viewpoint image obtained at the same time point can improve encoding efficiency.

FIG. 6 is a block diagram illustrating the configuration of the video encoding unit 52 in FIG. 4 that generates a Base stream, and the frame memory 53.

The configuration illustrated in FIG. 6 is similar to the configuration of the image information encoding apparatus in FIG. 1, except for the point that an image saved in the frame memory 53 is referred to by the dependent stream encoding unit 55.

FIG. 7 is a block diagram illustrating the configuration of the dependent stream encoding unit 55 in FIG. 4 that generates a Dependent stream, and the frame memory 56.

The configuration illustrated in FIG. 7 is similar to the configuration of the image information encoding apparatus in FIG. 1, except for the point that an image saved in the frame memory 53 can be referred to. A reference image read from the frame memory 53 is input to a motion prediction/compensation unit 90, and is used for motion prediction and motion compensation.

FIG. 8 is a block diagram illustrating an example configuration of a multi-viewpoint decoding apparatus 101.

A Base stream supplied from the multi-viewpoint encoding apparatus 41 via a network or a recording medium is input to a buffer 111, and a Dependent stream is input to a buffer 114. In a case where a single multiplexed stream is supplied, the stream is separated into a Base stream and a Dependent stream which are input to the buffer 111 and the buffer 114, respectively.

The Base stream which is delayed in the buffer 111 for a predetermined period of time is output to a video decoding unit 112.

In the video decoding unit 112, the Base stream is decoded in accordance with AVC, and a resulting decoded image is saved in a frame memory 113. The decoded image saved in the frame memory 113 is used as a reference image for decoding the next picture or a picture in the Dependent stream.

The decoded image obtained by the video decoding unit 112 is output as a video signal to a 3D display 102 at a predetermined timing.

In the meantime, the Dependent stream which is delayed in the buffer 114 for a predetermined period of time is output to a dependent stream decoding unit 115.

In the dependent stream decoding unit 115, the Dependent stream is decoded, and a resulting decoded image is saved in a frame memory 116. The decoded image saved in the frame memory 116 is used as a reference image for decoding the next picture.

In the dependent stream decoding unit 115, as appropriate, the image saved in the frame memory 113 is used as a reference image in accordance with information (such as a flag) in the bit stream.

The decoded image obtained by the dependent stream decoding unit 115 is output as a video signal to the 3D display 102 at a predetermined timing.

In the 3D display 102, a stereo image is displayed in accordance with the video signal supplied from the video decoding unit 112 and the video signal supplied from the dependent stream decoding unit 115.

FIG. 9 is a diagram illustrating the configuration of the video decoding unit 112 in FIG. 8 that decodes a Base stream, and the frame memory 113.

The configuration illustrated in FIG. 9 is similar to the configuration of the image information decoding apparatus in FIG. 2, except for the point that the image saved in the frame memory 113 is referred to by the dependent stream decoding unit 115.

FIG. 10 is a block diagram illustrating the configuration of the dependent stream decoding unit 115 in FIG. 8 that decodes a Dependent stream, and the frame memory 116.

The configuration illustrated in FIG. 10 is similar to the configuration of the image information decoding apparatus in FIG. 2, except for the point that the image saved in the frame memory 113 can be referred to. A reference image read from the frame memory 113 is input to a motion prediction/compensation unit 148, and is used for motion prediction and motion compensation.

CITATION LIST

Patent Literature

PTL 1: Japanese Unexamined Patent Application Publication No. 2007-208917

SUMMARY OF INVENTION

Technical Problem

In AVC and MVC, a virtual buffer model that simulates the operation of a buffer on the decoding apparatus side is defined in order to prevent buffer overflow or underflow.

On the encoding apparatus side, encoding is performed so as to prevent the virtual buffer from overflowing or underflowing. A decoding apparatus can decode the bit stream encoded in this manner without breaking a buffer.

A virtual buffer model will be described.

FIG. 11 is a diagram illustrating an example of a virtual buffer model.

An input bit stream is first supplied to a buffer 151. The bit stream is read instantaneously from the buffer 151 in units called AUs (access units), and is supplied to a video decoding unit 152.

In the video decoding unit 152, data read from the buffer 151 is decoded instantaneously and a decoded image is generated. The above assumption is made in the virtual buffer model.

It is to be noted that the buffer 151 in FIG. 11 corresponds to the buffers 111 and 114 in the multi-viewpoint decoding apparatus 101 in FIG. 8. In addition, the video decoding unit 152 in FIG. 11 corresponds to the video decoding unit 112 and the dependent stream decoding unit 115 in the multi-viewpoint decoding apparatus 101 in FIG. 8.

In the case of AVC, one AU stores data of one picture.

In the case of MVC, one AU stores data of all views (the Base stream and the Dependent stream) obtained at the same time point. Here, the term view means an image obtained from each viewpoint.

The behavior of the buffer 151 in such a virtual buffer model is illustrated in FIG. 12. In FIG. 12, the vertical axis represents the amount of buffer occupancy, and the horizontal axis represents time.

As illustrated in FIG. 12, a bit stream is supplied to the buffer 151 at a predetermined bit rate. In addition, at the read time of each AU, the bit stream stored in the corresponding AU is extracted from the buffer 151. Times $t_1, t_2, t_3, \ldots$ are read times from the buffer 151.

FIG. 13 is a diagram illustrating the configuration of AUs of a bit stream encoded using MVC.

In the upper part of FIG. 13, AUs #1, #2, and #3 are illustrated.

The AU #1 is composed of a picture $P_1$ in the Base stream and a picture $P_2$ in the Dependent stream, which are pictures at the same time point (data of the pictures is stored).

The AU #2 is composed of a picture $P_3$ in the Base stream and a picture $P_4$ in the Dependent stream, which are pictures at the same time point.

The AU #3 is composed of a picture $P_5$ in the Base stream and a picture $P_6$ in the Dependent stream, which are pictures at the same time point.

In the lower part of FIG. 13, the configuration of a bit stream is illustrated.

The bit stream in FIG. 13 is a single stream configured by multiplexing the Base stream and the Dependent stream. Each AU has a NAL unit called AD (AU Delimiter) inserted at the beginning thereof. The AD is a certain unique data string.

The AD represents the start position of data of a picture in the Base stream and a picture in the Dependent stream which are at the same time point.

As illustrated in FIG. 13, in the bit stream, the AU #1 is composed of AD #1, picture $P_1$, and picture $P_2$.

The AU #2 is composed of AD #2, picture $P_3$, and picture $P_4$.

The AU #3 is composed of AD #3, picture $P_5$, and picture $P_6$.

Searching for an AD makes it possible to find the beginning of the AU and to easily access a predetermined picture.

FIG. 14 includes diagrams illustrating an example of the structure of bit streams.

Part A of FIG. 14 illustrates a structure in a case where of a Base stream and a Dependent stream are multiplexed into a single bit stream. The structure of the bit stream in part A of FIG. 14 is the same as the structure of the bit stream in FIG. 13.

Part B of FIG. 14 illustrates a structure in a case where a Base stream and a Dependent stream are separately included in a total of two bit streams. Portions corresponding to the portions illustrated in part A of FIG. 14 are assigned the same symbols.

As illustrated in part B of FIG. 14, the Base stream is configured by arranging AD #1, picture $P_1$, AD #2, picture $P_3$, the AD #3, and picture $P_5$ in this order.

In the meantime, the Dependent stream is configured by arranging picture $P_2$, picture $P_4$, and picture $P_6$ in this order.

A decoding process for the bit streams in FIG. 14 will be described using the configuration in FIG. 11.

For example, in a case where the bit stream in part A of FIG. 14 is supplied, after detecting the AD #1, the video decoding unit 152 in FIG. 11 sequentially reads the picture $P_1$ in the Base stream and the picture $P_2$ in the Dependent stream, and individually decodes the pictures.

In addition, in a case where the bit streams in part B of FIG. 14 are supplied, for the first AU in the Base stream, the video decoding unit 152 detects the AD #1, and reads and decodes the picture $P_1$. In addition, for the second AU, the video decoding unit 152 detects the AD #2, and reads and decodes the picture $P_3$.

Since the Dependent stream contains no ADs, it is necessary to analyze the syntax in the bit stream and to determine the boundaries of the pictures $P_2$, $P_4$, and $P_6$ in order to read each picture. Therefore, the processing is very complicated.

Here, a case is considered where an AD is simply added to the beginning of each picture in the Dependent stream in a manner similar to that in the Base stream so that the beginning of the picture can be readily detected.

In this case, for example, if the Base stream and the Dependent stream are multiplexed into a single bit stream, the video decoding unit 152 may recognize an AU of the Base stream and an AU of the Dependent stream as different AUs. This does not make it possible to correctly reproduce the operation of the virtual buffer model.

The present invention has been made in light of such a situation, and is intended to allow easy detection of picture boundaries in a Dependent stream on a bit stream.

Solution to Problem

An image signal decoding apparatus in an aspect of the present invention is an image signal decoding apparatus that decodes a bit stream produced by encoding a stereoscopic image signal including image signals obtained from a plurality of viewpoints, including decoding means for decoding a first unique data string indicating the start of image encoded bit streams obtained from all the viewpoints at a predetermined time point, the first unique data string being encoded in an image obtained from one viewpoint, identifying the start of encoded data obtained at the predetermined time point, decoding a second unique data string indicating the start of an image encoded bit stream obtained from another viewpoint at the predetermined time point, the second unique data string being individually encoded at the beginning of an encoded bit stream of an image obtained from the other viewpoint, identifying the start of encoded data of an image signal obtained from the other viewpoint, and decoding the bit stream.

The image signals obtained from the plurality of viewpoints can be image signals obtained from two viewpoints, and are configured as a single bit stream.

Image signals obtained from a plurality of viewpoints can be image signals obtained from two viewpoints, and are configured as two bit streams.

The decoding means can be configured to decode the first unique data string indicating the start of image encoded bit streams obtained from all the viewpoints at the predetermined time point, the first unique data string being encoded in an image obtained from one of the viewpoints, identify the start of encoded data obtained at the predetermined time point, decode the second unique data string indicating the start of an image encoded bit stream obtained from the other viewpoint at the predetermined time point, the second unique data string being encoded at the beginning of an encoded bit stream of an image obtained from the other viewpoint, identify the start of encoded data of an image signal obtained from the other viewpoint, and decode the bit stream.

In the case of accessing a position at which decoding can be started correctly, the decoding means can be configured to decode the first unique data string indicating the start of image encoded bit streams obtained from all the viewpoints at the predetermined time point, the first unique data string being encoded in an image obtained from one viewpoint, identify the start of encoded data obtained at the predetermined time point from the one viewpoint, decode the second unique data strings indicating the start of the image encoded bit stream obtained from the other viewpoint at the predetermined time point, the second unique data string being individually encoded at the beginning of the encoded bit stream of the image obtained from the other viewpoint, identify the start of the encoded data of the image signal obtained from the other viewpoint, and decode the bit stream from identified start positions.

An image signal decoding method in the aspect of the present invention is an image signal decoding method for decoding a bit stream produced by encoding a stereoscopic image signal including image signals obtained from a plurality of viewpoints, including the steps of decoding a first unique data string indicating the start of image encoded bit streams obtained from all the viewpoints at a predetermined time point, the first unique data string being encoded in an image obtained from one viewpoint; identifying the start of encoded data obtained at the predetermined time point; decoding a second unique data string indicating the start of an image encoded bit stream obtained from another viewpoint at the predetermined time point, the second unique data string being individually encoded at the beginning of an encoded bit stream of an image obtained from the other viewpoint; identifying the start of encoded data of an image signal obtained from the other viewpoint; and decoding the bit stream.

A program in the aspect of the present invention is a program for causing a computer to execute a process for decoding a bit stream produced by encoding a stereoscopic image signal including image signals obtained from a plurality of viewpoints, the program causing the computer to execute a process comprising the steps of decoding a first unique data string indicating the start of image encoded bit streams obtained from all the viewpoints at a predetermined time point, the first unique data string being encoded in an image obtained from one viewpoint; identifying the start of encoded data obtained at the predetermined time point; decoding a second unique data string indicating the start of an image encoded bit stream obtained from another viewpoint at the predetermined time point, the second unique data string being individually encoded at the beginning of an encoded bit stream of an image obtained from the other viewpoint; identifying the start of encoded data of an image signal obtained from the other viewpoint; and decoding the bit stream.

An image signal encoding apparatus in another aspect of the present invention is an image signal encoding apparatus that encodes a stereoscopic image signal including image signals obtained from a plurality of viewpoints, including encoding means for encoding a first unique data string in an image obtained from one viewpoint, the first unique data string indicating the start of image encoded bit streams obtained from all the viewpoints at a predetermined time point, and individually encoding a second unique data string at the beginning of an encoded bit stream of an image obtained from another viewpoint, the second unique data string indicating the start of an image encoded bit stream obtained from the other viewpoint at the predetermined time point.

The encoding means can be configured to multiplex encoded data obtained from all the viewpoints into a single bit stream.

The encoding means can be configured to cause encoded data obtained from all the viewpoints to be included in two bit streams.

The image signals obtained from the plurality of viewpoints can be image signals obtained from two viewpoints.

An image signal encoding method in the other aspect of the present invention is an image signal encoding method for encoding a stereoscopic image signal including image signals obtained from a plurality of viewpoints, including the steps of encoding a first unique data string in an image obtained from one viewpoint, the first unique data string indicating the start of image encoded bit streams obtained from all the viewpoints at a predetermined time point; and individually encoding a second unique data string at the beginning of an encoded bit stream of an image obtained from another viewpoint, the second unique data string indicating the start of an image encoded bit stream obtained from the other viewpoint at the predetermined time point.

A program in the other aspect of the present invention is a program for causing a computer to execute a process for encoding a stereoscopic image signal including image signals obtained from a plurality of viewpoints, the program causing the computer to execute a process comprising the steps of encoding a first unique data string in an image obtained from one viewpoint, the first unique data string indicating the start of image encoded bit streams obtained from all the viewpoints at a predetermined time point; and individually encoding a second unique data string at the beginning of an encoded bit stream of an image obtained from another viewpoint, the second unique data string indicating the start of an image encoded bit stream obtained from the other viewpoint at the predetermined time point.

In an aspect of the present invention, a first unique data string indicating the start of image encoded bit streams obtained from all viewpoints at a predetermined time point, which is encoded in an image obtained from one viewpoint, is decoded, and the start of encoded data obtained at the predetermined time point is identified. In addition, a second unique data string indicating the start of an image encoded bit stream obtained from another viewpoint at the predetermined time point, which is individually encoded at the beginning of an encoded bit stream of an image obtained from the other viewpoint, is decoded, the start of encoded data of an image signal obtained from the other viewpoint is identified, and a bit stream is decoded.

In another aspect of the present invention, a first unique data string indicating the start of image encoded bit streams obtained from all viewpoints at a predetermined time point is encoded in an image obtained from one viewpoint, and a second unique data string indicating the start of an image encoded bit stream obtained from another viewpoint at the predetermined time point is individually encoded at the beginning of an encoded bit stream of an image obtained from the other viewpoint.

Advantageous Effects of Invention

According to an aspect of the present invention, it is possible to easily detect picture boundaries of a Dependent stream on a bit stream.

BRIEF DESCRIPTION OF DRAWINGS

FIG. 18 is a diagram illustrating the syntax of the NAL unit.

FIG. 19 is a diagram illustrating the definition of nal_unit_type.

FIG. 20 is a diagram illustrating the definition of nal_unit_type.

FIG. 22 is a diagram illustrating syntax including the NAL unit.

DESCRIPTION OF EMBODIMENTS

[Configuration of Multi-Viewpoint Encoding Apparatus]

Figure 15:
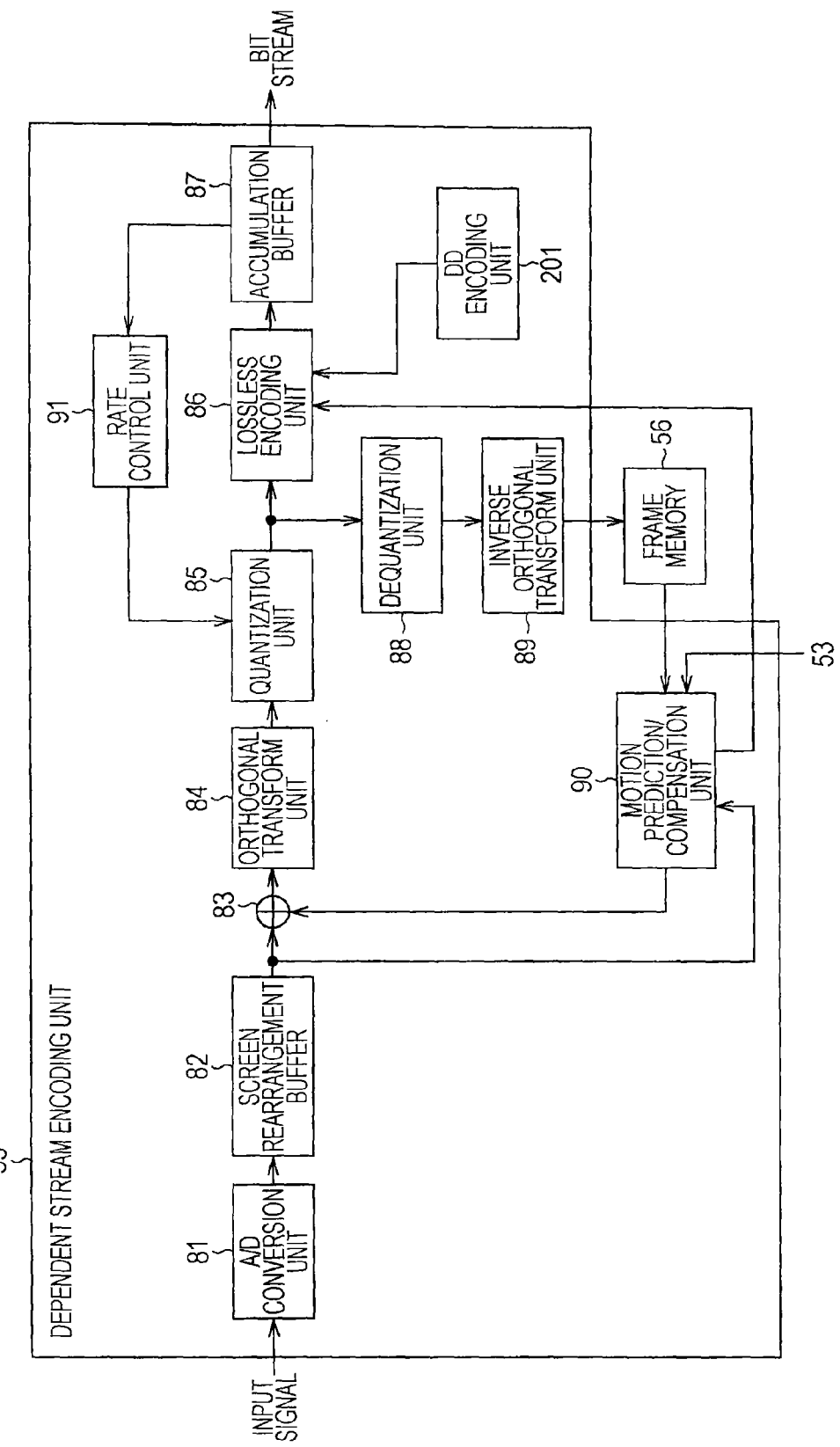
FIG. 15 is a block diagram illustrating an example configuration of a dependent stream encoding unit that is a portion of a multi-viewpoint encoding apparatus according to an embodiment of the present invention.

FIG. 15 is a block diagram illustrating an example configuration of a dependent stream encoding unit that is a portion of a multi-viewpoint encoding apparatus according to an embodiment of the present invention.

In a multi-viewpoint encoding apparatus according to an embodiment of the present invention, a Base stream has encoded therein information indicating AU boundaries, and a Dependent stream has encoded therein information indicating boundaries between pictures in the Dependent stream.

This enables a multi-viewpoint decoding apparatus to, on the occasion of decoding bit streams of a stereoscopic image, determine AU boundaries or the like with easy processing and to perform the decoding operation based on a virtual buffer model.

Figure 1:
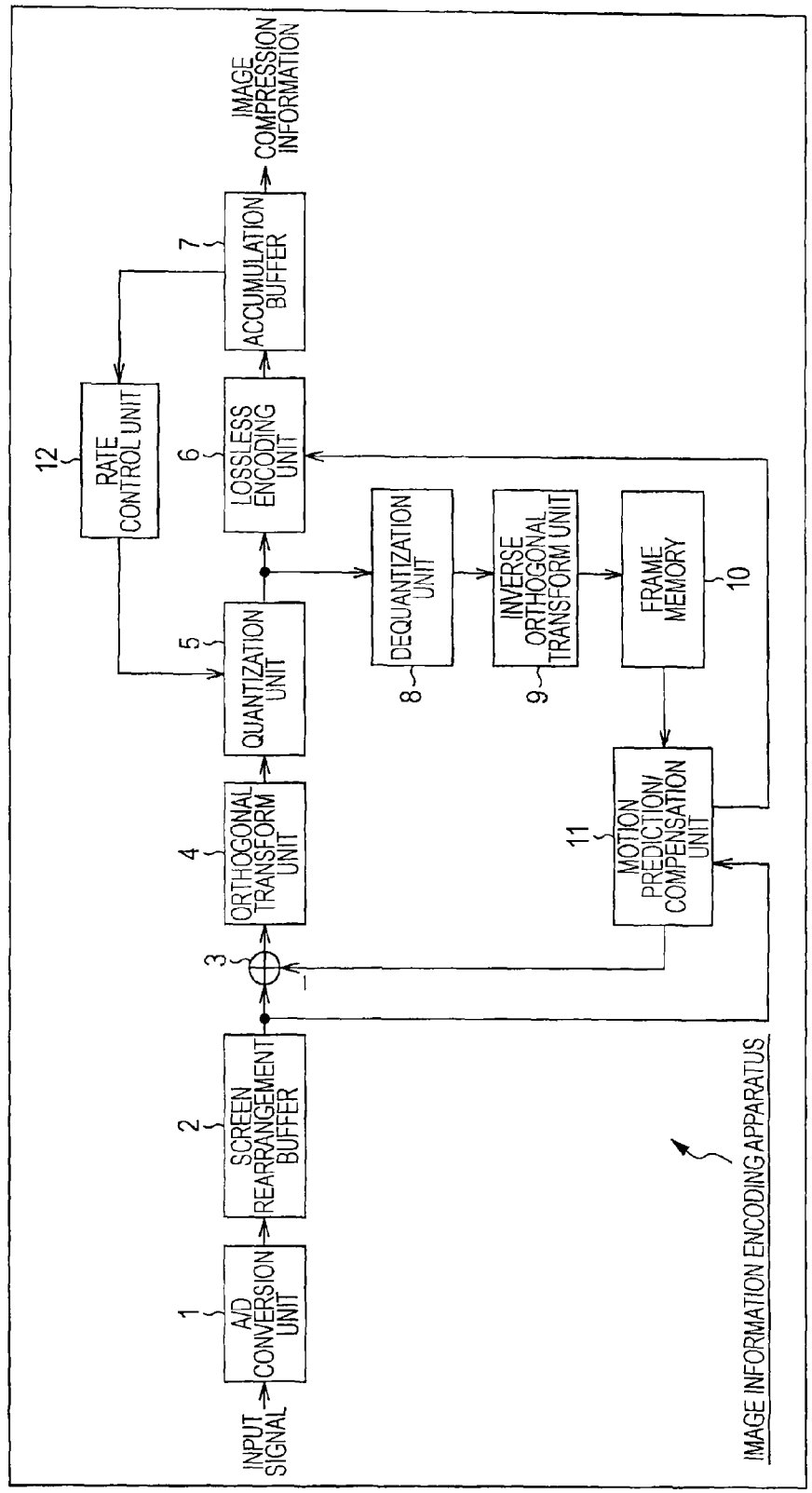
FIG. 1 is a block diagram illustrating an example configuration of an image information encoding apparatus.
Figure 2:
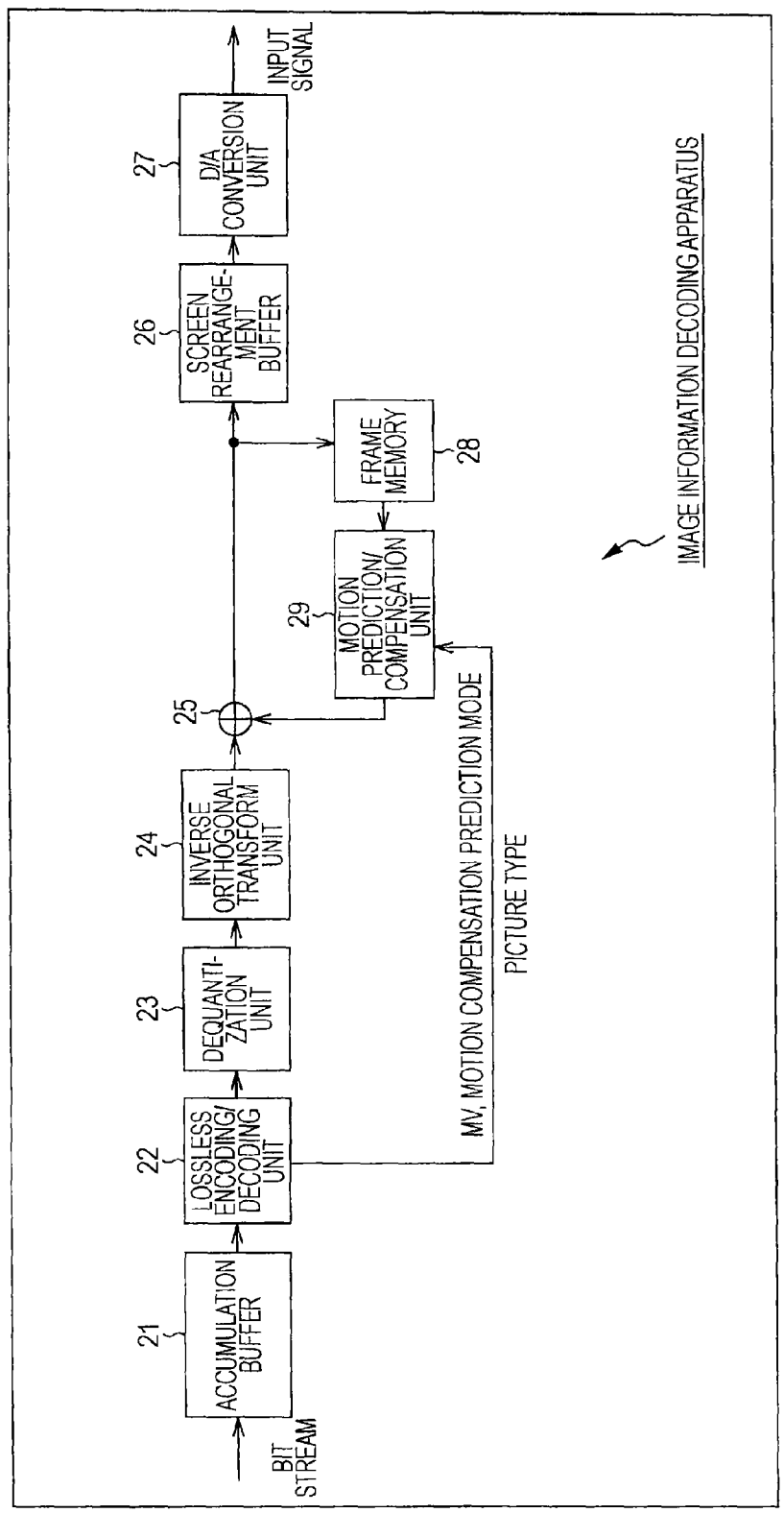
FIG. 2 is a block diagram illustrating an example configuration of an image information decoding apparatus.
Figure 3:
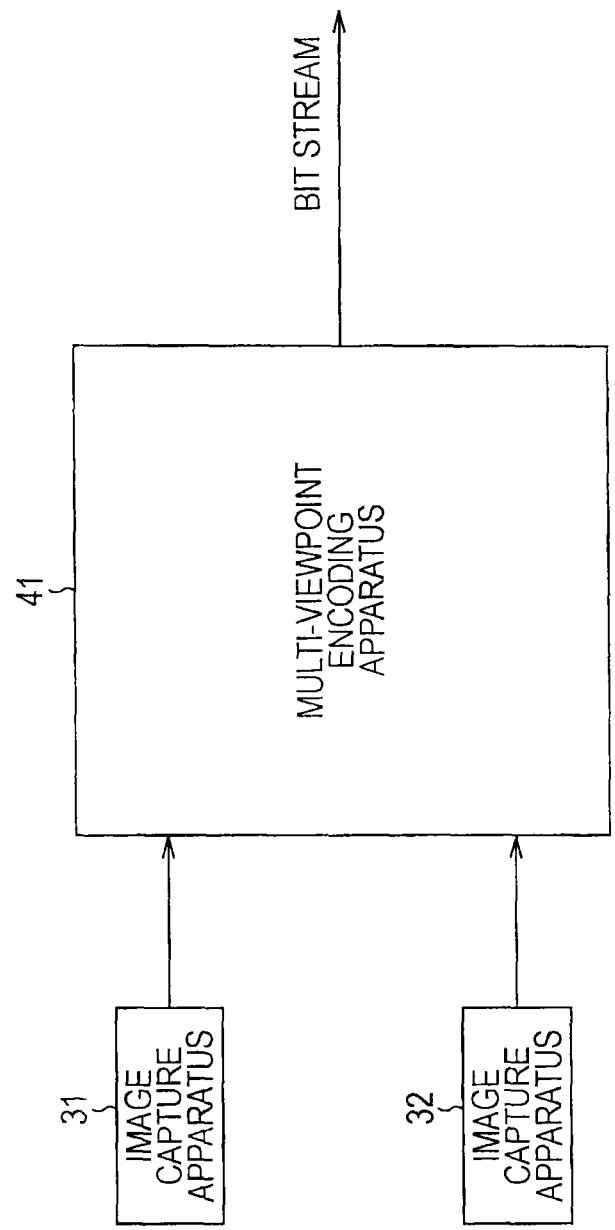
FIG. 3 is a diagram illustrating a multi-viewpoint encoding apparatus.
Figure 4:
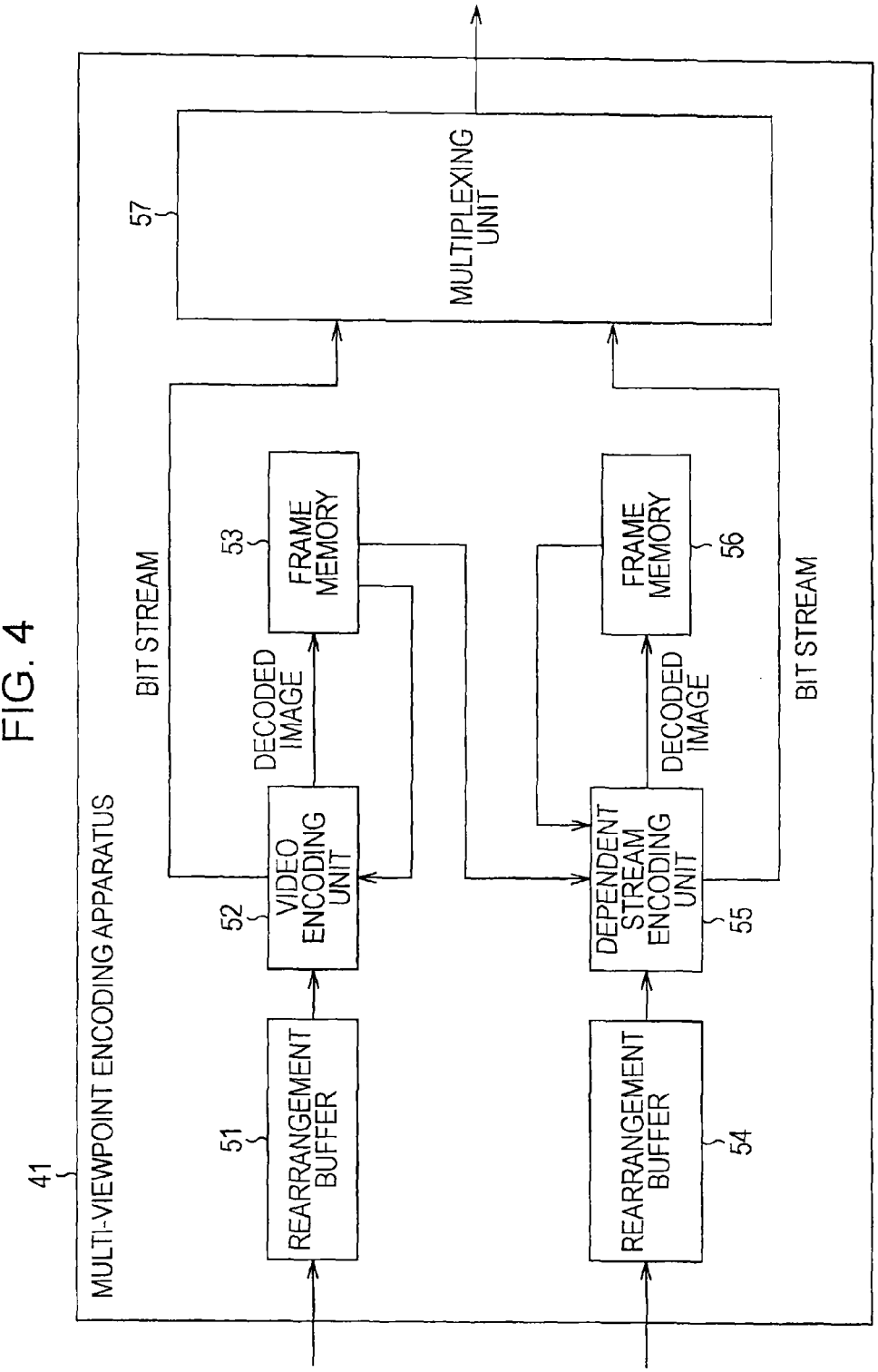
FIG. 4 is a block diagram illustrating an example configuration of the multi-viewpoint encoding apparatus in FIG. 3.
Figure 5:
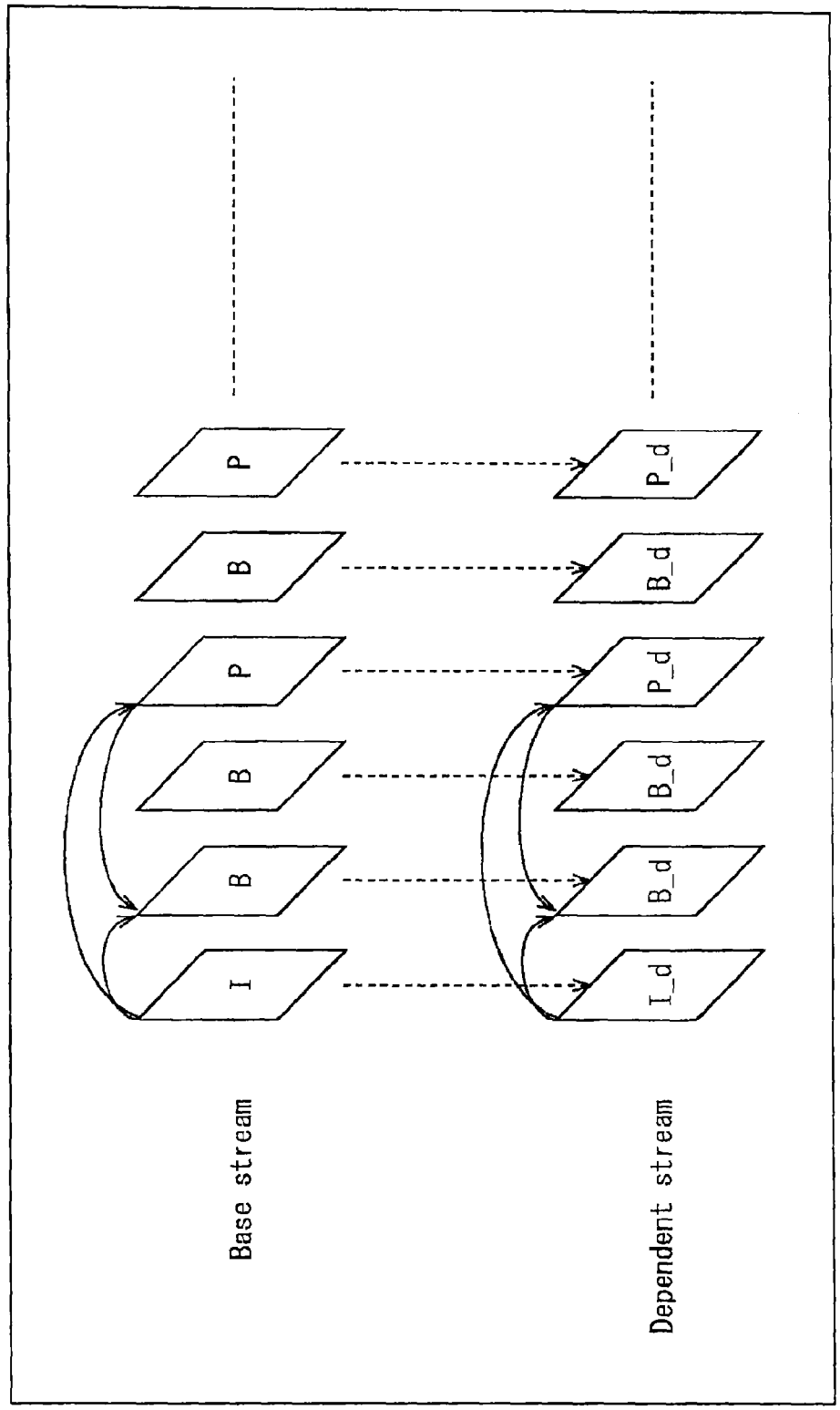
FIG. 5 is a diagram illustrating an example of an MVC reference image.
Figure 6:
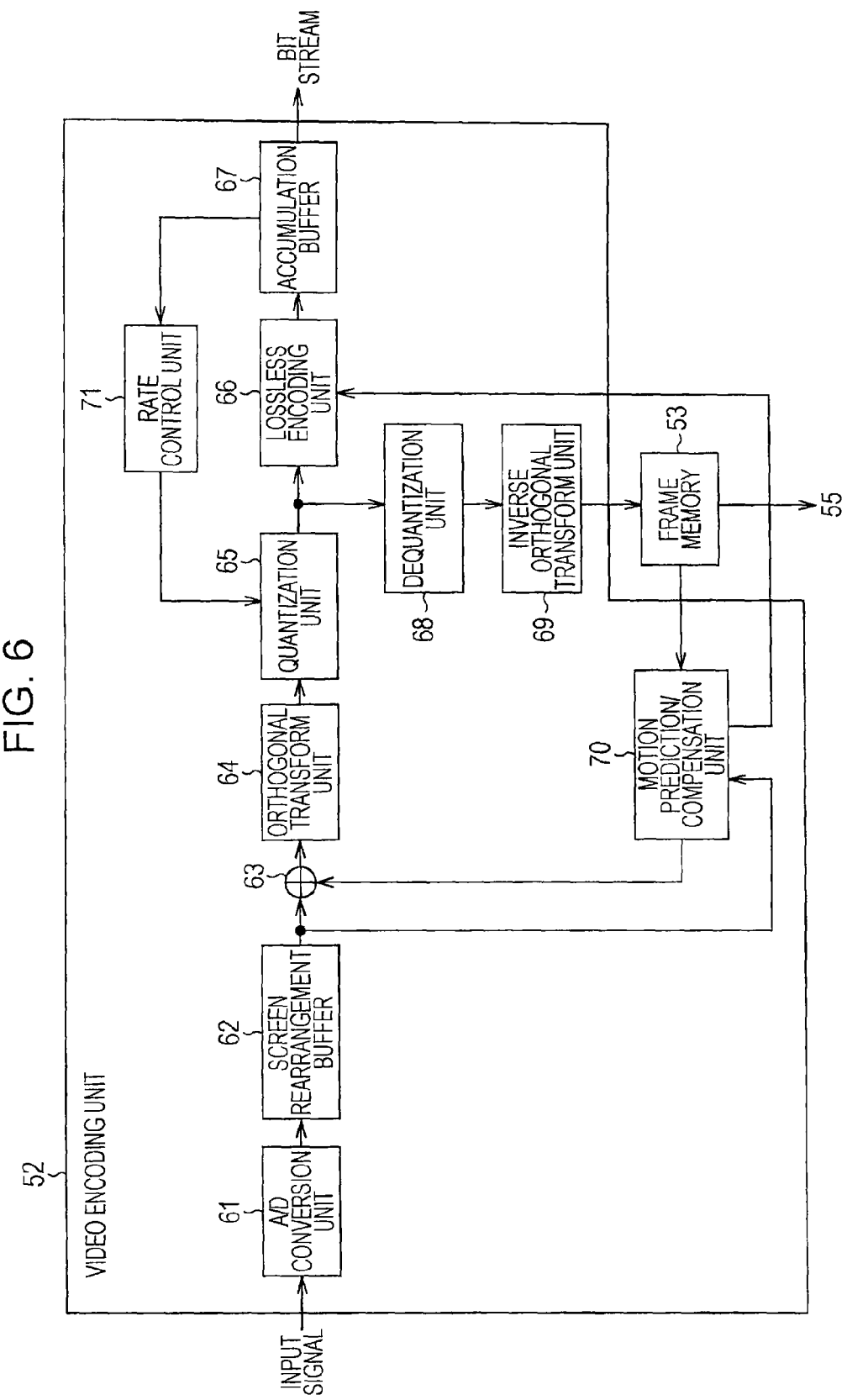
FIG. 6 is a block diagram illustrating the configuration of a video encoding unit in FIG. 4 and a frame memory.

The multi-viewpoint encoding apparatus has the same configuration as the configuration in FIG. 4. FIG. 15 illustrates an example configuration of the dependent stream encoding unit 55 in FIG. 4. A video encoding unit 52 of a multi-viewpoint encoding apparatus 41 according to an embodiment of the present invention has the same configuration as the configuration in FIG. 6. The same configuration elements are assigned the same numerals.

Figure 7:
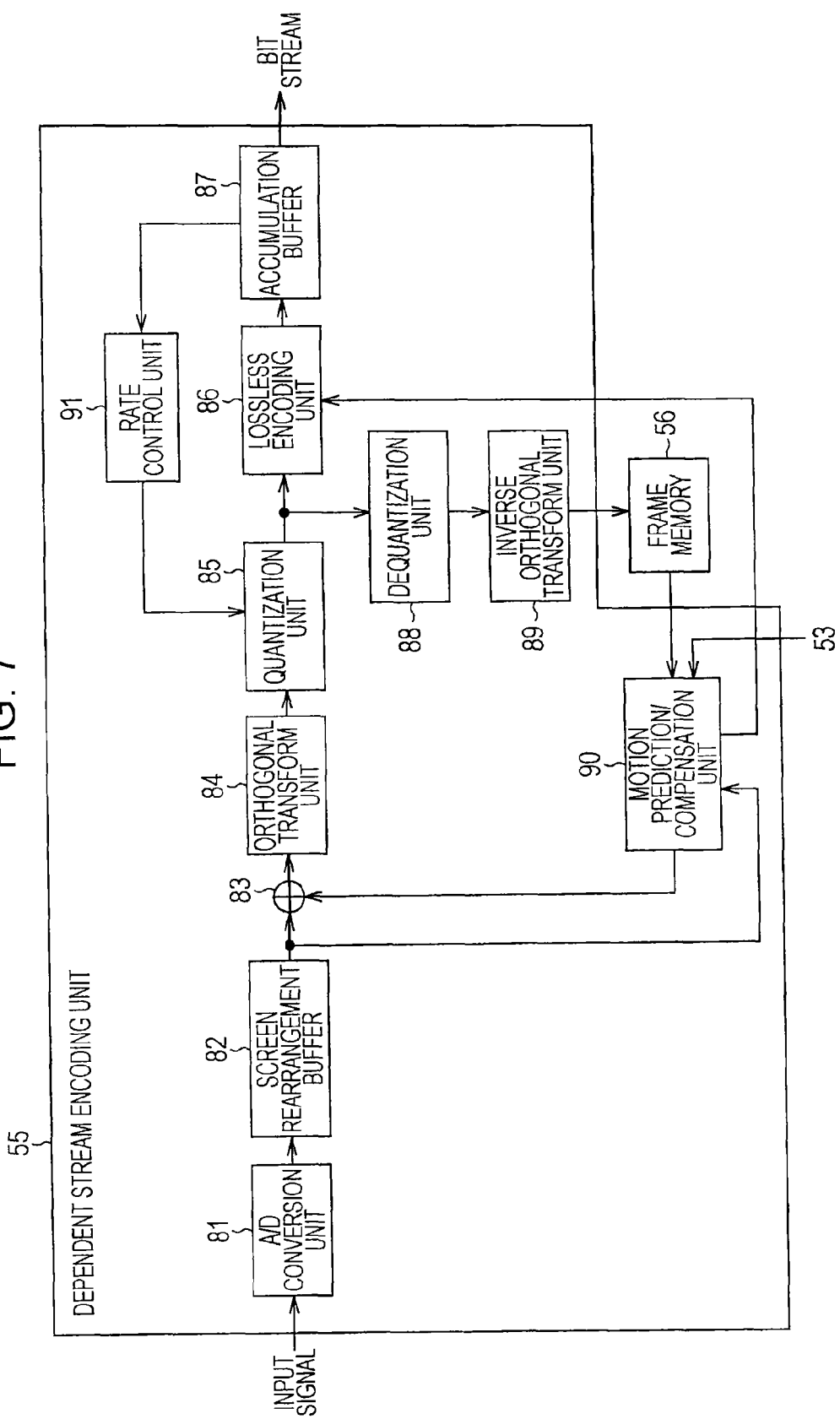
FIG. 7 is a block diagram illustrating the configuration of a dependent stream encoding unit in FIG. 4 and a frame memory.

The configuration of the dependent stream encoding unit 55 illustrated in FIG. 15 is the same configuration as the configuration in FIG. 7, except for the point that a DD encoding unit 201 is provided and the point that the output of the DD encoding unit 201 is supplied to the lossless encoding unit 86.

The DD encoding unit 201 inserts a NAL unit called DD (Dependent delimiter) (View and dependency representation delimiter NAL unit) at the beginning of each picture in a Dependent stream. The DD is a unique data string like the AD but has a value different from the AD.

The lossless encoding unit 86 inserts the NAL unit of the DD generated by the DD encoding unit 201 into the beginning of each picture, performs encoding, and outputs a Dependent stream into which the DD has been inserted.

Figure 16:
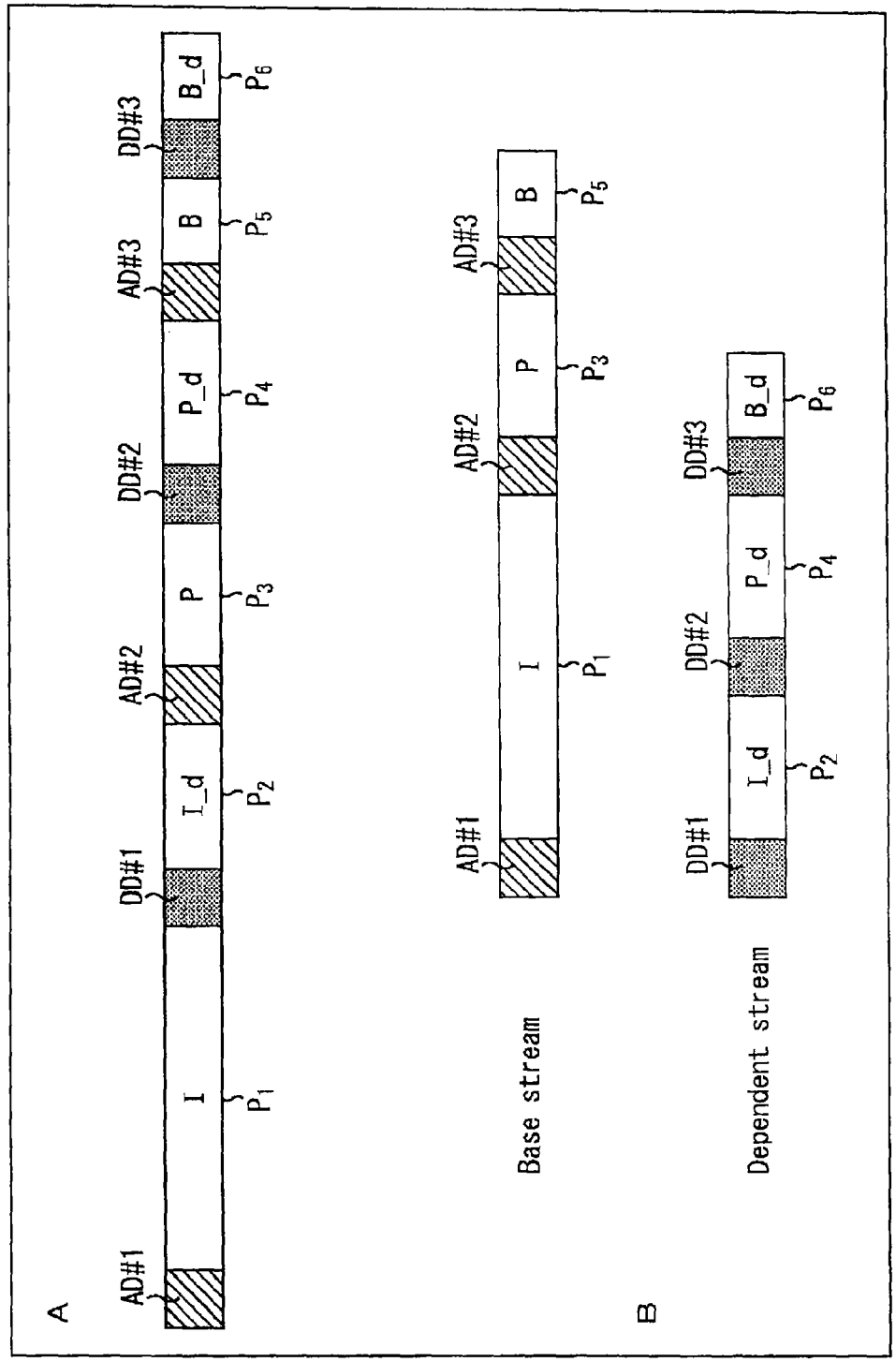
FIG. 16 includes diagrams illustrating an example of the structure of bit streams.

FIG. 16 includes diagrams illustrating an example of the structure of bit streams generated by the multi-viewpoint encoding apparatus 41 including the dependent stream encoding unit 55 in FIG. 15.

Part A of FIG. 16 illustrates an example of a structure in a case where a Base stream and a Dependent stream are multiplexed into a single bit stream.

Part B of FIG. 16 illustrates an example of a structure in a case where a Base stream and a Dependent stream are separately included in a total of two bit streams. Portions corresponding to the portions illustrated in part A of FIG. 16 are assigned the same symbols.

In the case of generating the bit stream in part A of FIG. 16, after encoding the AD #1, the multi-viewpoint encoding apparatus 41 encodes the picture $P_1$ in the Base stream. Next, the multi-viewpoint encoding apparatus 41 encodes DD #1 before encoding the pictures in the Dependent stream, and thereafter encodes the picture $P_2$ in the Dependent stream.

When the process target is switched to the next AU, the multi-viewpoint encoding apparatus 41 encodes the AD #2 and encodes the picture $P_3$ in the Base stream. Next, the multi-viewpoint encoding apparatus 41 encodes DD #2 before encoding the pictures in the Dependent stream, and thereafter encodes the picture $P_4$ in the Dependent stream.

In a similar manner, the multi-viewpoint encoding apparatus 41 encodes DDs before encoding the pictures in the Dependent stream, and arranges the pictures in the Dependent stream immediately after the DDs.

Also in this example, ADs are placed at the beginning of AUs. The first AU is composed of AD #1, picture $P_1$, DD #1, and picture $P_2$, and the second AU is composed of AD #2, picture $P_3$, DD #2, and picture $P_4$. The third AU is composed of AD #3, picture $P_5$, DD #3, and picture $P_6$.

In the case of generating the bit streams in part B of FIG. 16, for the Base stream, after encoding the AD #1, the multi-viewpoint encoding apparatus 41 encodes the picture $P_1$ in the Base stream. When the process target is switched to the next AU, the multi-viewpoint encoding apparatus 41 encodes the AD #2, and encodes the picture $P_3$ in the Base stream.

In addition, for the Dependent stream, after encoding the DD #1, the multi-viewpoint encoding apparatus 41 encodes the picture $P_2$ in the Dependent stream. When the process target is switched to the next AU, the multi-viewpoint encoding apparatus 41 encodes the DD #2 and encodes the picture $P_4$ in the Dependent stream.

In a similar manner, the multi-viewpoint encoding apparatus 41 encodes the DDs before encoding the pictures in the Dependent stream, and arranges the pictures in the Dependent stream immediately after the DDs.

As illustrated in part B of FIG. 16, the Base stream is configured by arranging AD #1, picture P$_1$, AD #2, picture P$_3$, AD #3, and picture P$_5$ in this order.

In the meantime, the Dependent stream is configured by arranging DD #1, picture P$_2$, DD #2, picture P$_4$, DD #3, and picture P$_6$ in this order.

Also in the example in part B of FIG. 16, the first AU is composed of AD #1, picture P$_1$, DD #1, and picture P$_2$, and the second AU is composed of AD #2, picture P$_3$, DD #2, and picture P$_4$. The third AU is composed of AD #3, picture P$_5$, DD #3, and picture P$_6$.

An AD represents the start position of data of a picture in the Base stream and a picture in the Dependent stream, which are obtained at the same time point, that is, represents the start position of image encoding bit streams obtained from all viewpoints at a predetermined time. In addition, a DD represents the boundary position of data of a picture in the Dependent stream, that is, represents the start position of an image encoding bit stream in the Dependent stream.

[Regarding Syntax]

The syntax of a DD will be described.

All encoded data items including an AD and pictures are stored in a unit called a NAL unit, and are rearranged in a predetermined order to configure a bit stream. The details are described in ISO/IEC 14496-10|ITU-T H.264.

A DD is also stored in a NAL unit.

Figure 17:
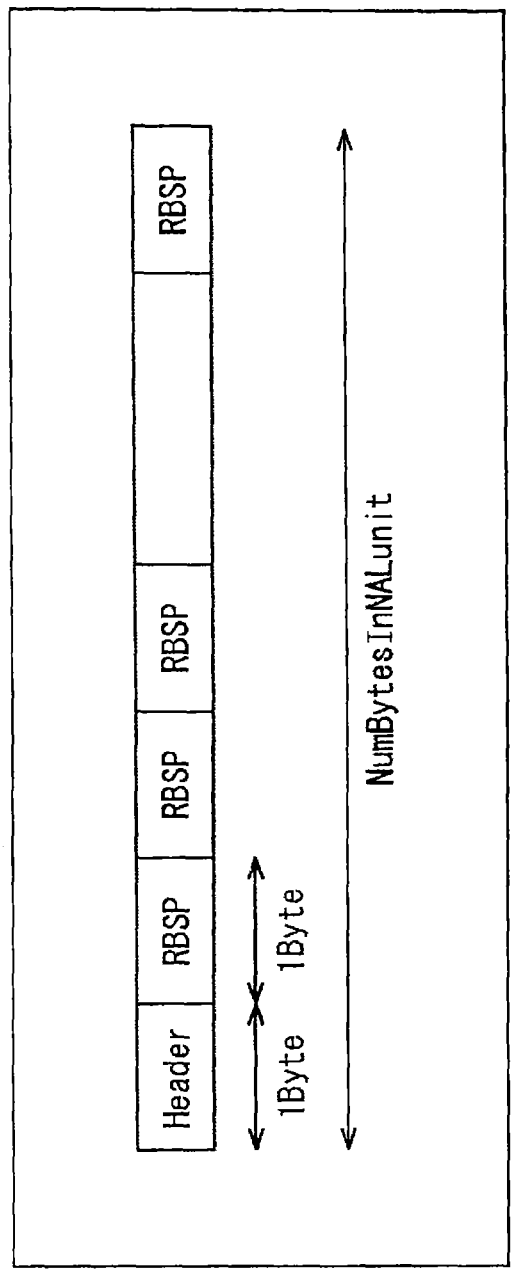
FIG. 17 is a diagram illustrating an example configuration of a NAL unit.

FIG. 17 is a diagram illustrating an example configuration of a NAL unit.

Encoded data items and the header are handled byte-by-byte. NAL_BytesInNALunit is a parameter indicating the size of the NAL unit in bytes, which is necessary to identify NAL unit boundaries.

One method for identifying NAL unit boundaries is to search for start codes. In other cases, it is necessary to transmit the NAL unit size to a decoder using some method. rbsp_byte[ ] represents encoded data items or the header that are stored in a NAL unit.

FIG. 18 is a diagram illustrating the syntax of a NAL unit.

forbidden_zero_bit is 1-bit data, which is always 0.

nal_ref_idc is 2-bit data, which indicates that the data items in the NAL unit are referred to by other NAL units if the nal_ref_idc value is a value other than 0. If the nal_ref_idc value is 0, the data items are not referred to by other NAL units.

nal_unit_type is 5-bit data, which indicates the content of the NAL unit.

forbidden_zero_bit, nal_ref_idc, and nal_unit_type constitute the header in FIG. 17.

FIGS. 19 and 20 are diagrams illustrating the definition of nal_unit_type.

As illustrated in FIG. 19, nal_unit_type=9 indicates that the content of the NAL unit is an AD.

As illustrated in FIG. 20, nal_unit_type=18 indicates that the content of the NAL unit is a DD.

Figure 21:
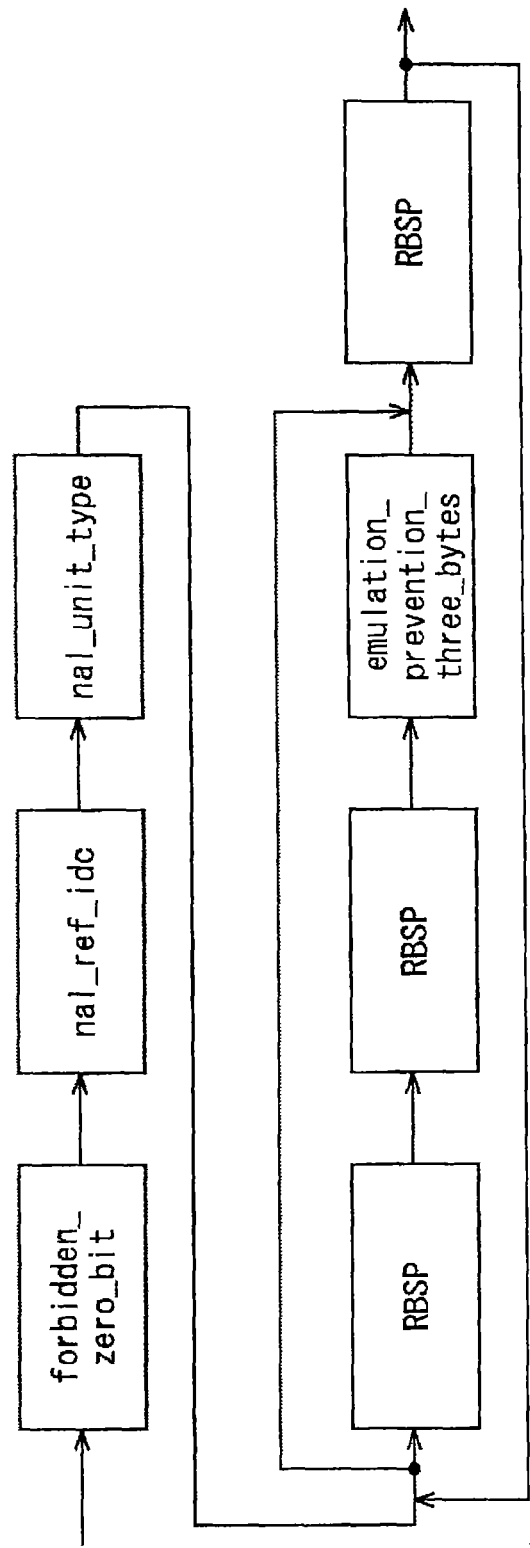
FIG. 21 is a diagram illustrating the simplified syntax of a NAL unit.

The simplified syntax of the NAL unit in FIG. 18 is as illustrated in FIG. 21.

The NAL unit has the start code added therein in accordance with the syntax illustrated in FIG. 22, and constitutes a stream called a byte stream. The byte stream corresponds to the bit stream described above.

startcode_prefix (start_code_prefix_one_3 bytes) of 3 bytes (0x000001) in FIG. 22 is a start code to be added to the beginning of the NAL unit. startcode_prefix is a unique code that must not appear at other places in the byte stream.

Searching for startcode_prefix in a byte stream results in detecting the beginning of a NAL unit. In addition, checking nal_unit_type at the header of the NAL unit whose beginning has been detected makes it possible to access a desired NAL unit.

Figure 23:
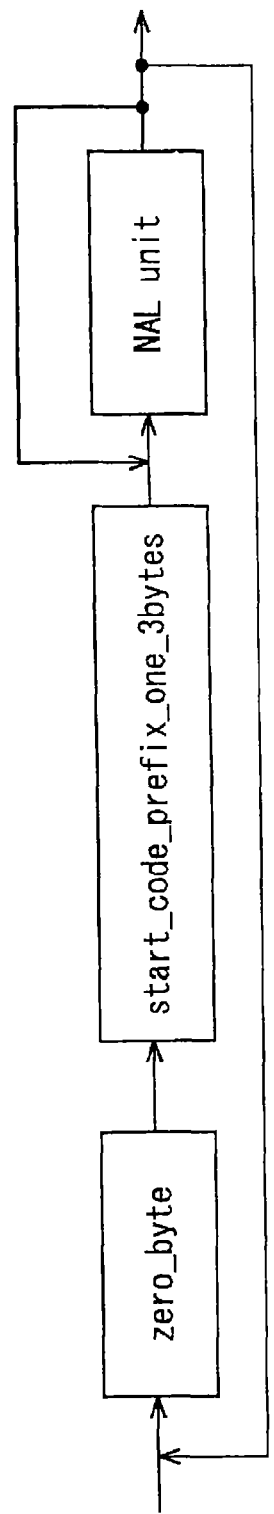
FIG. 23 is a diagram illustrating a simplification of the syntax in FIG. 22.

A simplification of the syntax in FIG. 22 is as illustrated in FIG. 23.

In this manner, DDs are placed at boundaries of pictures in a Dependent stream regardless of whether the Dependent stream is multiplexed with the Base stream into a single bit stream or is included in another bit stream.

A start code is added to the beginning of a NAL unit storing a DD, and the nal_unit_type value of the NAL unit is set to 18, which indicates that the content is a DD.

The multi-viewpoint decoding apparatus can detect the beginning of a NAL unit by detecting a start code. In addition, checking that the nal_unit_type value of the NAL unit whose beginning has been detected is 18 makes it possible to detect a DD, that is, a picture boundary (beginning) in a Dependent stream.

[Multi-Viewpoint Decoding Apparatus]

Figure 24:
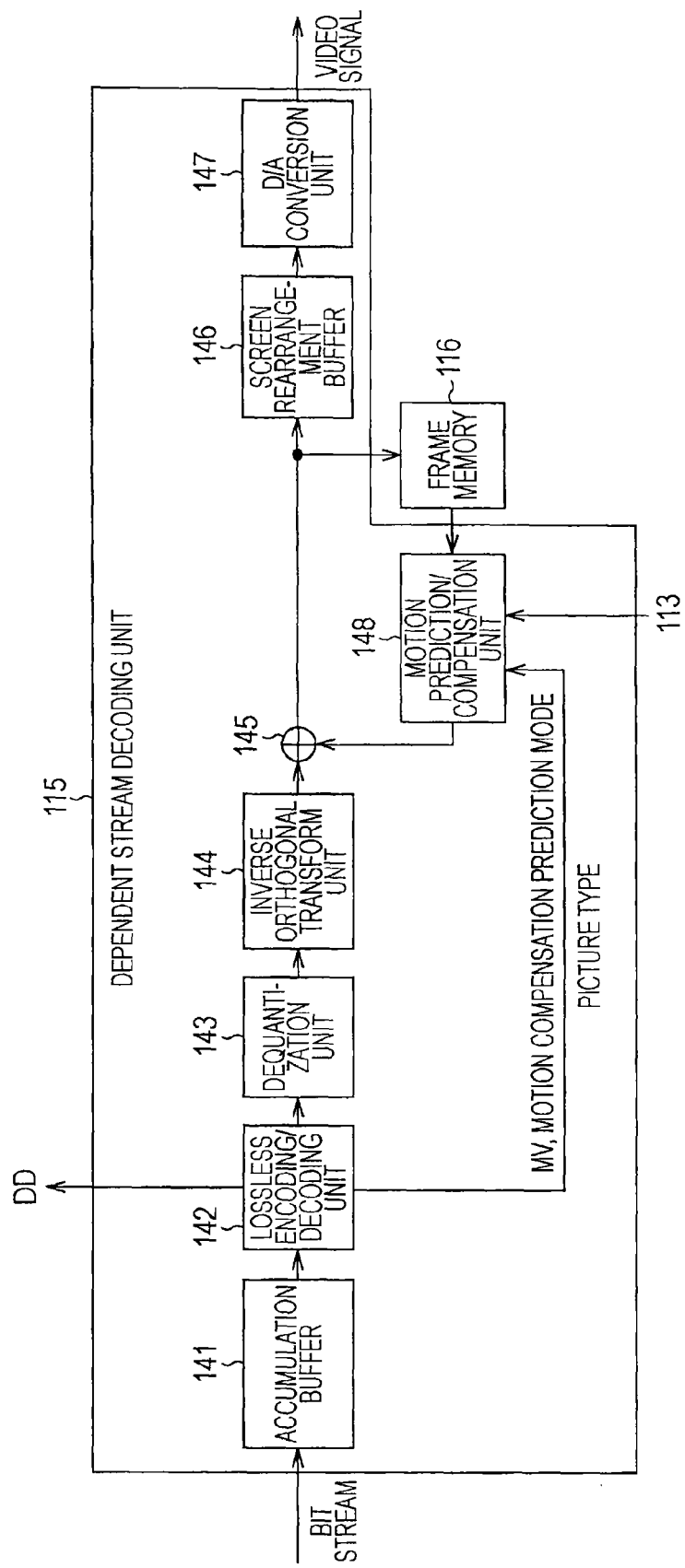
FIG. 24 is a block diagram illustrating an example configuration of a dependent stream decoding unit that is a portion of a multi-viewpoint decoding apparatus according to an embodiment of the present invention.

FIG. 24 is a block diagram illustrating an example configuration of a dependent stream decoding unit that is a portion of a multi-viewpoint decoding apparatus according to an embodiment of the present invention.

Figure 8:
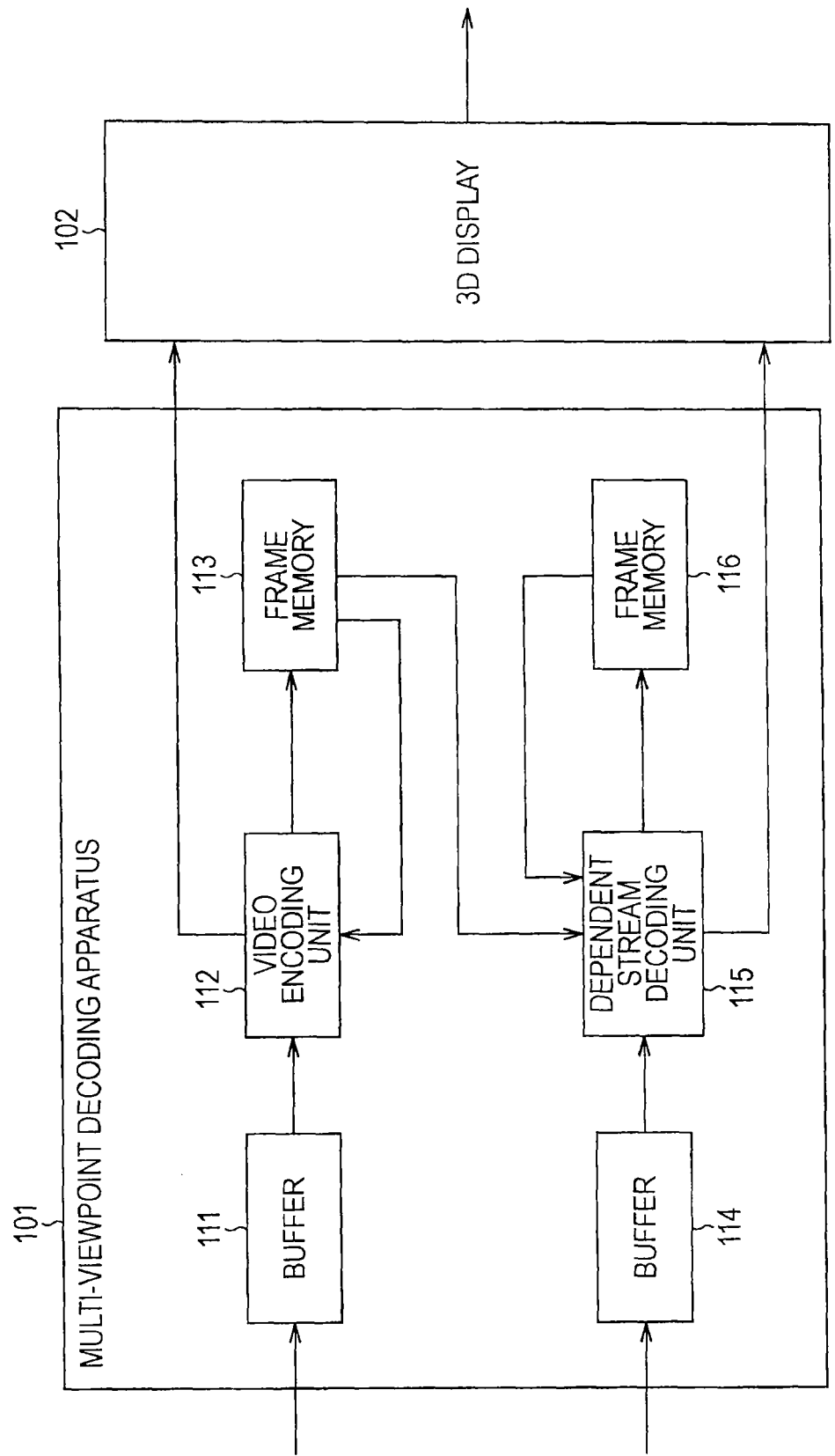
FIG. 8 is a block diagram illustrating an example configuration of a multi-viewpoint decoding apparatus.
Figure 9:
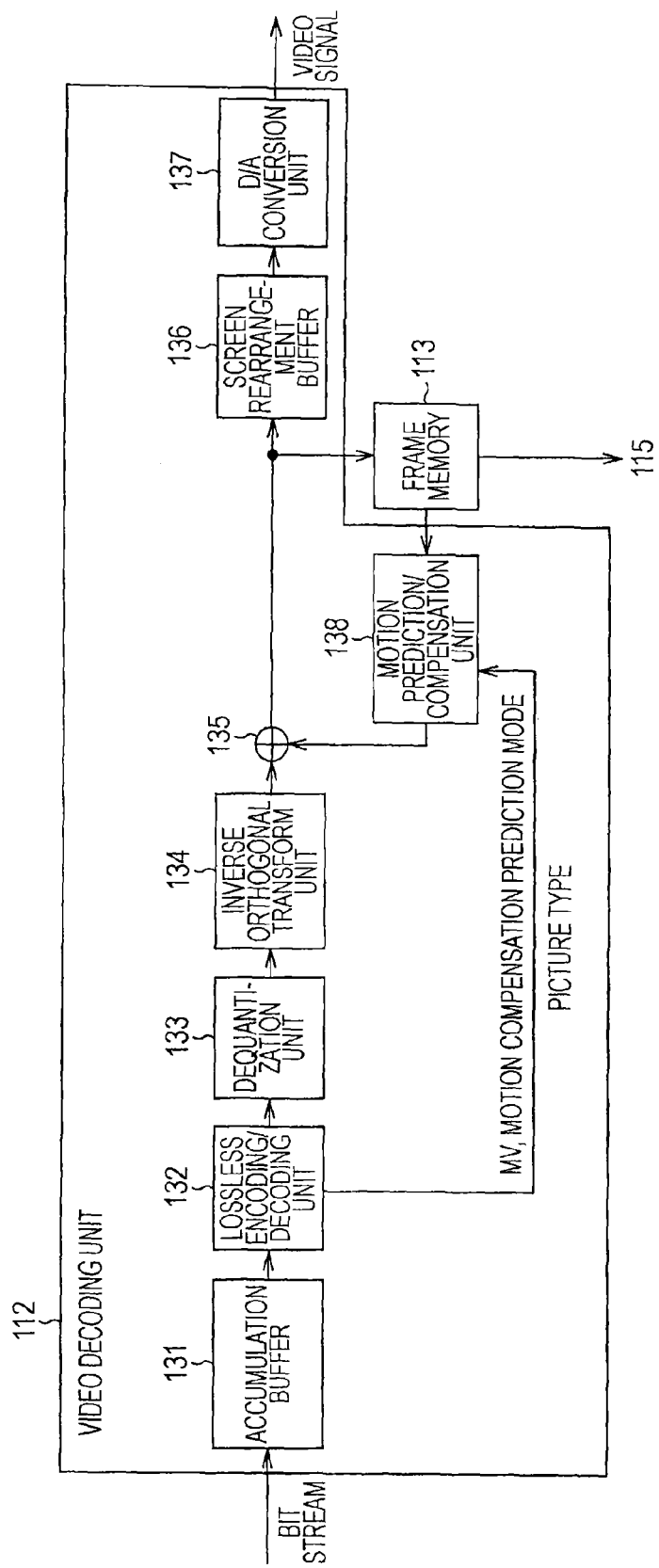
FIG. 9 is a diagram illustrating the configuration of a video decoding unit in FIG. 8 and a frame memory.

A multi-viewpoint decoding apparatus according to an embodiment of the present invention has the same configuration as the configuration in FIG. 8. FIG. 24 illustrates an example configuration of the dependent stream decoding unit 115 in FIG. 8. A video decoding unit 112 of a multi-viewpoint decoding apparatus 101 according to an embodiment of the present invention has the same configuration as the configuration in FIG. 9.

Figure 10:
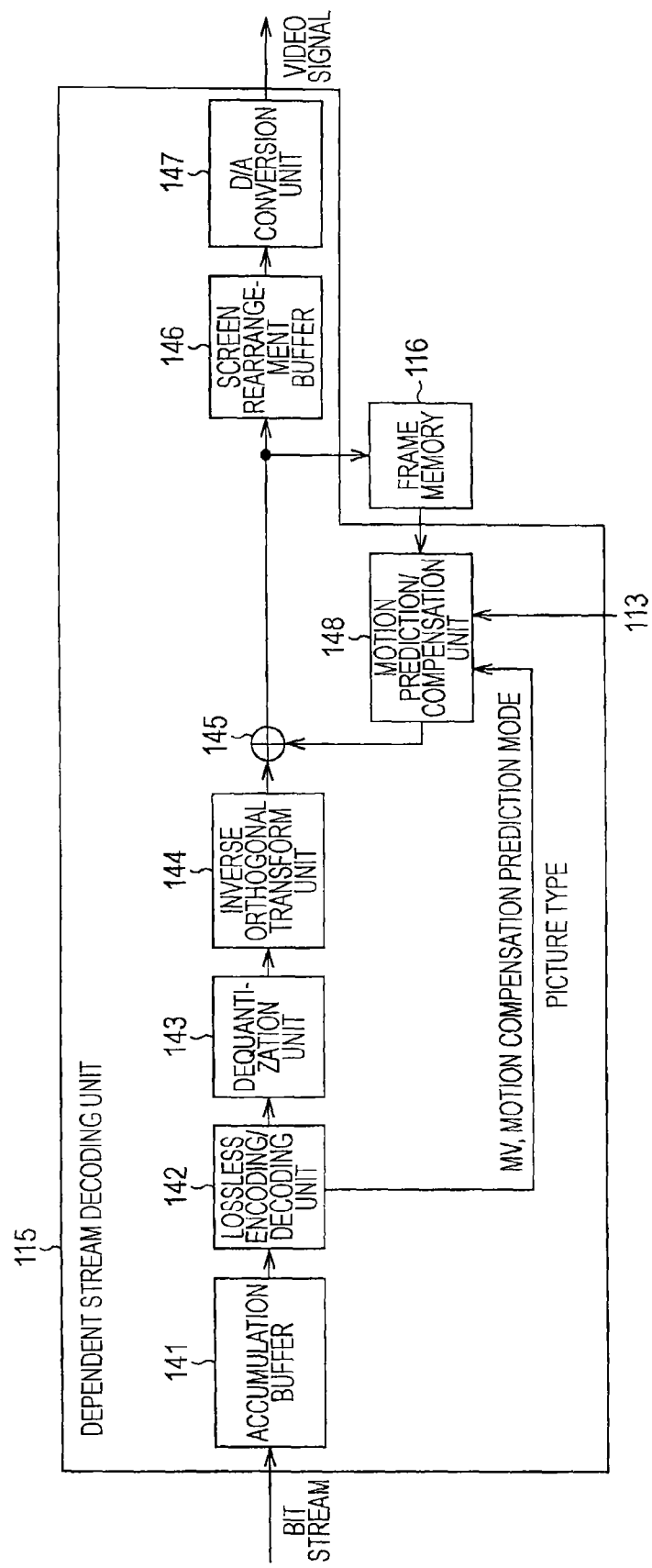
FIG. 10 is a block diagram illustrating the configuration of a dependent stream decoding unit in FIG. 8 and a frame memory.

The configuration of the dependent stream decoding unit 115 illustrated in FIG. 24 is the same configuration as the configuration in FIG. 10, except for the point that DDs are output from the lossless encoding/decoding unit 142.

The lossless encoding/decoding unit 142 decodes a DD included in a Dependent stream, and outputs the DD. Based on the output DD, the start position of decoding or the like at the time of random access is specified by an upper application or the like.

An MVC virtual buffer model will be described.

Figure 25:
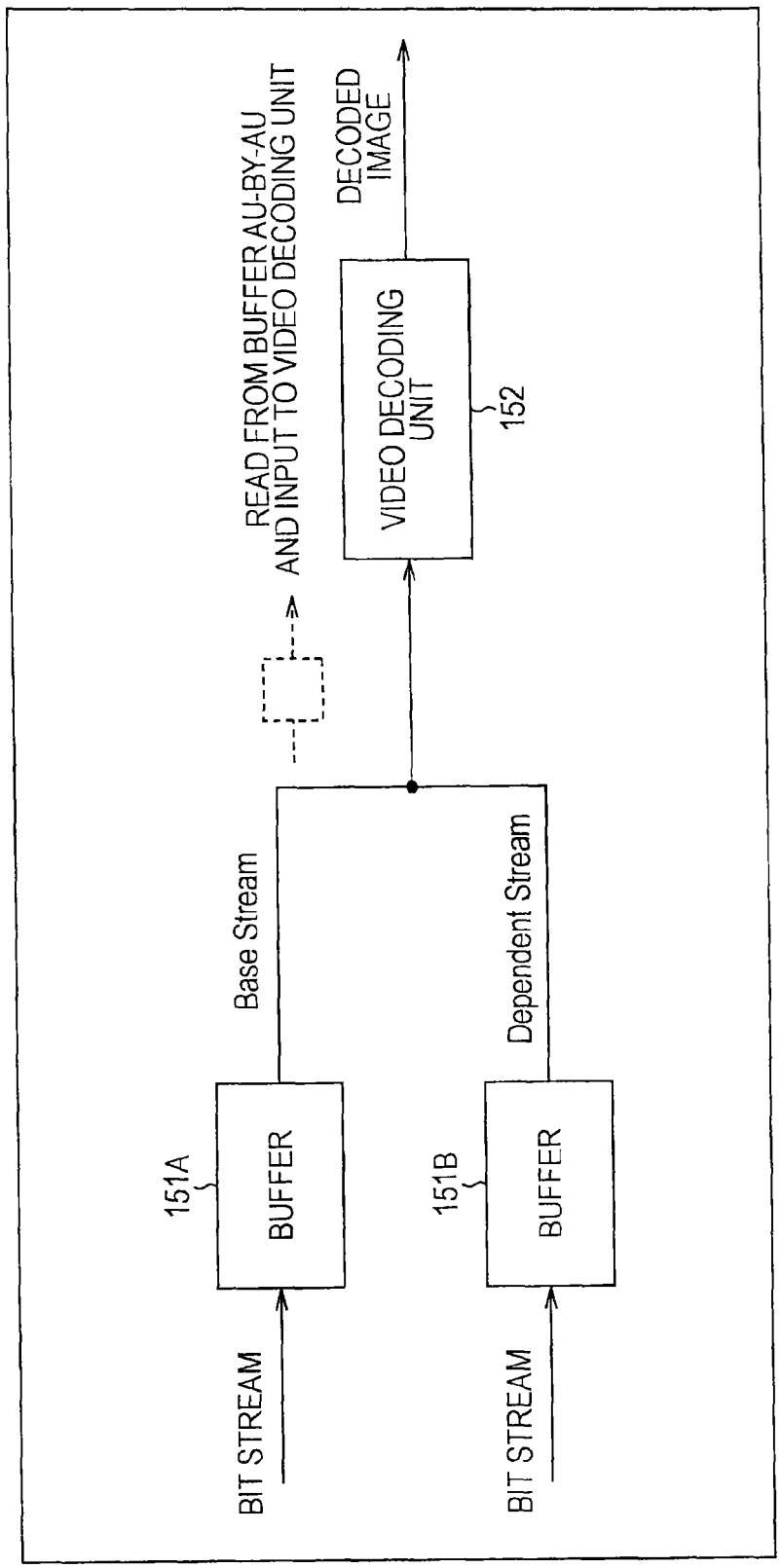
FIG. 25 is a diagram illustrating an example of a virtual buffer model.

FIG. 25 is a diagram illustrating an example of a virtual buffer model in a case where an MVC bit stream is composed of two streams, that is, a Base stream and a Dependent stream.

An input Base stream is stored in a buffer 151A, and a Dependent stream is stored in a buffer 151B. Bit streams are read instantaneously from the buffers 151A and 151B on an AU-by-AU basis, and are decoded instantaneously by a video decoding apparatus 152.

It is to be noted that the buffer 151A in FIG. 25 corresponds to the buffer 111 in the multi-viewpoint decoding apparatus 101 in FIG. 8 and that the buffer 151B in FIG. 25 corresponds to the buffer 114 in the multi-viewpoint decoding apparatus 101 in FIG. 8. In addition, the video decoding unit 152 in FIG. 25 corresponds to the video decoding unit 112 and the dependent stream decoding unit 115 in the multi-viewpoint decoding apparatus 101 in FIG. 8.

For example, in a case where the Base stream in part B of FIG. 16 is stored in the buffer 151A, and the Dependent stream is stored in the buffer 151B, at a certain timing, the picture P$_1$ is read from the buffer 151A in accordance with the AD #1, and the picture P$_2$ is read from the buffer 151B in accordance with the DD #1. The read pictures are decoded by the video decoding unit 152.

In addition, at the next timing, the picture P$_3$ is read from the buffer 151A in accordance with the AD #2, and the picture P$_4$ is read from the buffer 151B in accordance with the DD #2.

Figure 11:
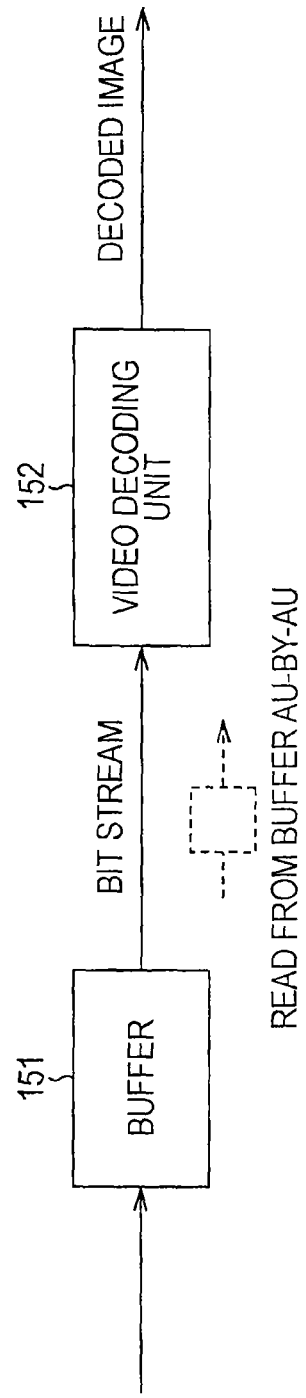
FIG. 11 is a diagram illustrating an example of a virtual buffer model.
Figure 12:
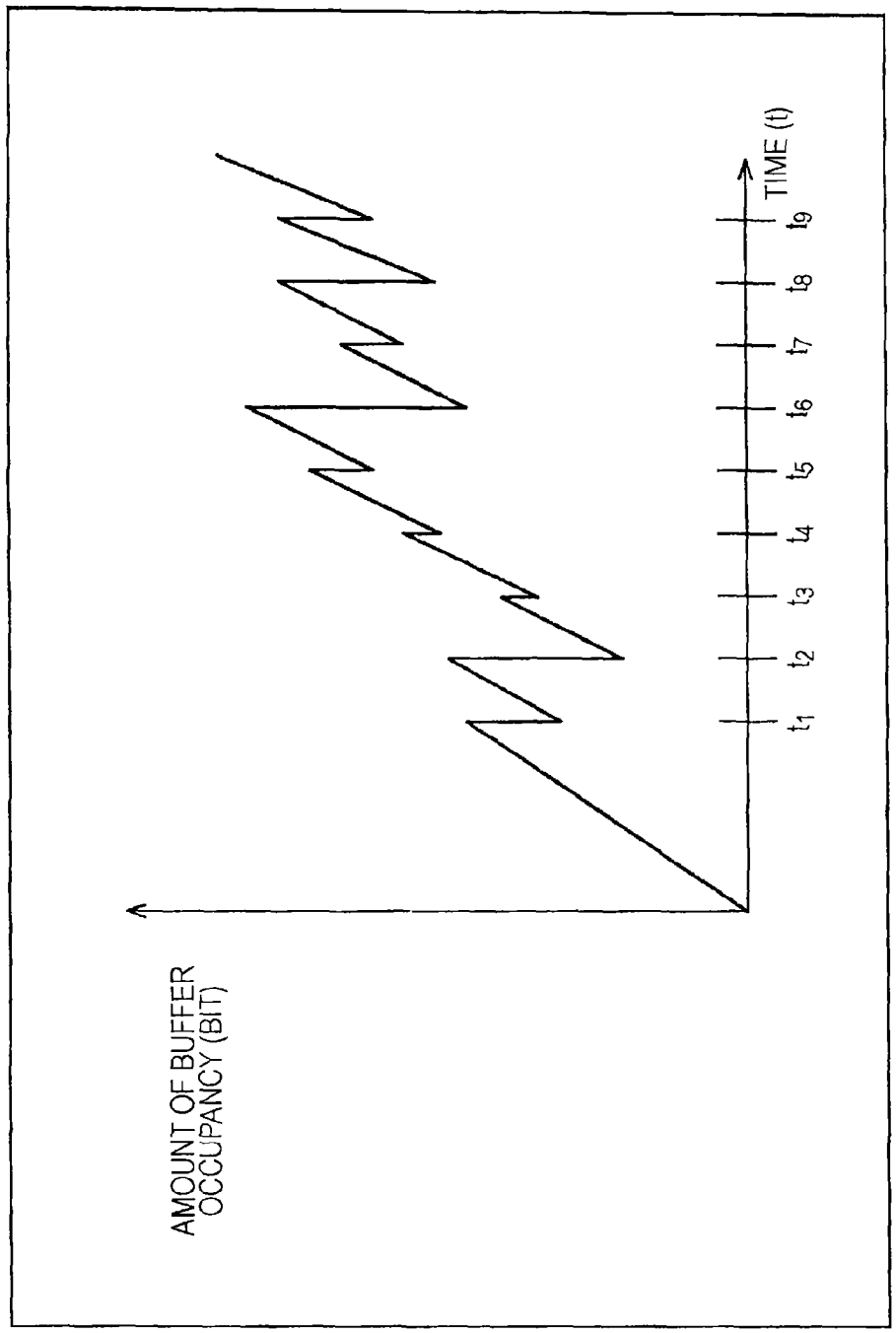
FIG. 12 is a diagram illustrating the behavior of a buffer in FIG. 11.
Figure 13:
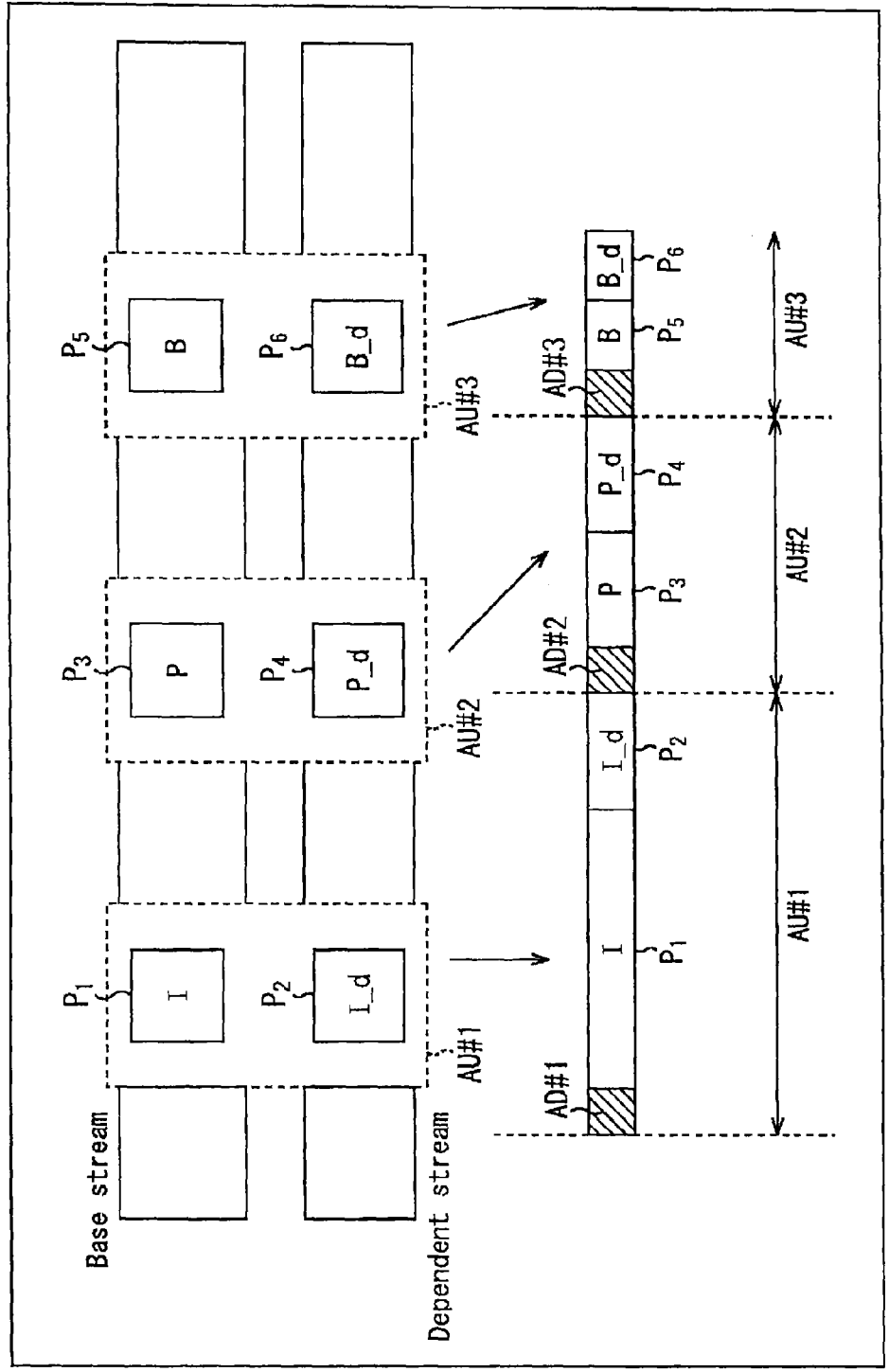
FIG. 13 is a diagram illustrating the configuration of AUs of a bit stream encoded using MVC.

A virtual buffer model in a case where an MVC bit stream is composed of a single stream having a Base stream and a Dependent stream is the same as that illustrated in FIG. 11.

For example, in a case where the bit stream in part A of FIG. 16 is stored in the buffer 151 in FIG. 11, at a certain timing, the pictures $P_1$ and $P_2$ are read from the buffer 151 in accordance with the AD #1.

In addition, at the next timing, the pictures $P_3$ and $P_4$ are read from the buffer 151 in accordance with the AD #2.

Figure 26:
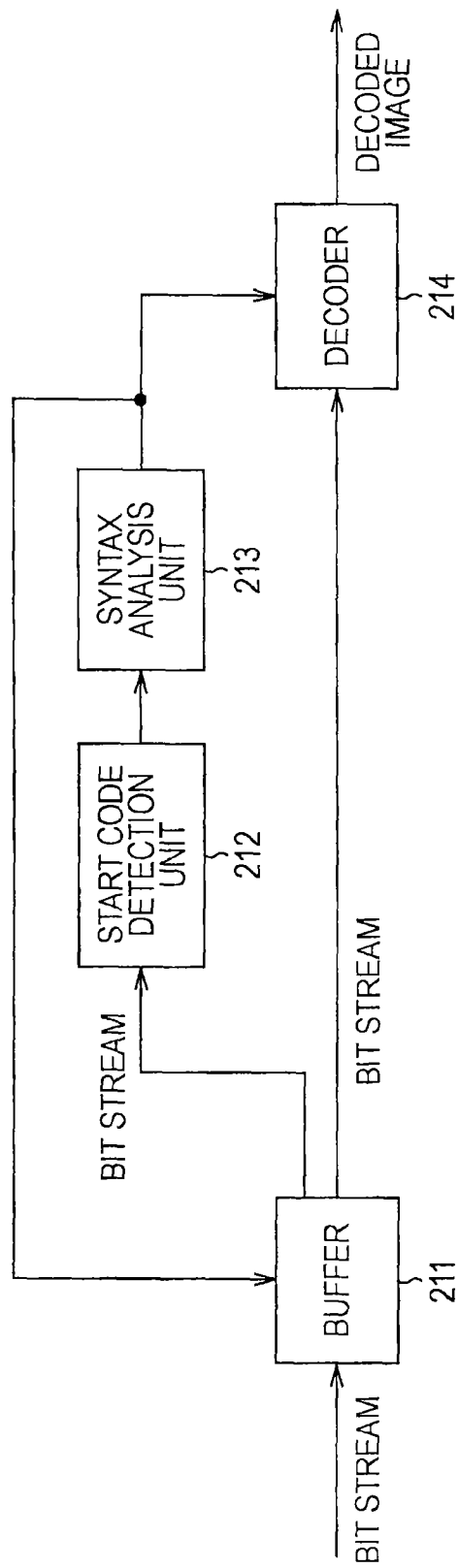
FIG. 26 is a diagram illustrating an example of a method for accessing the beginning of an AU.

Next, an example of a method for accessing the beginning of a predetermined AU at the time of random access, at the time of occurrence of an error, or the like will be described with reference to FIG. 26.

An input bit stream is first supplied to a buffer 211 and is temporarily stored. Thereafter, the bit stream is supplied to a start code detection unit 212 and a decoder 214.

The start code detection unit 212 detects a start code having a unique data string. Upon detection of a start code, the start code detection unit 212 outputs subsequent data to a syntax analysis unit 213.

The syntax analysis unit 213 analyzes the data supplied from the start code detection unit 212. Because of the data subsequent to the start code, the data supplied from the start code detection unit 212 is data of a NAL unit.

Upon identification of the start position of an AU by analyzing the header or the like of a NAL unit, the syntax analysis unit 213 outputs a signal indicating an AU start position to the decoder 214 and the buffer 211.

In a case where an AD is present (in a case where data of a NAL unit is supplied), the syntax analysis unit 213 checks whether or not nal_unit_type=9 is satisfied. In a case where nal_unit_type=9 is satisfied, as described above, the content of the NAL unit is an AD. Thus, the beginning of the AU is detected.

Similarly, in a case where an AD is present, the syntax analysis unit 213 checks whether or not nal_unit_type=18 is satisfied. In a case where nal_unit_type=18 is satisfied, as described above, the content of the NAL unit is a DD. Thus, the beginning of a picture in the Dependent stream is detected.

The decoder 214 and the buffer 211 subsequently perform decoding of pictures on an AU-by-AU basis in a normal manner in accordance with the signal from the syntax analysis unit 213.

Figure 27:
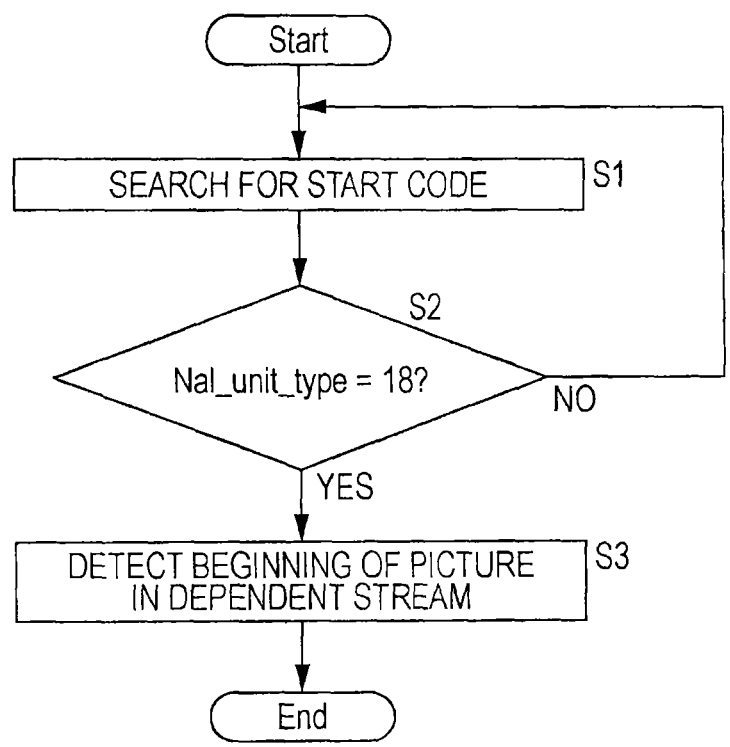
FIG. 27 is a flowchart describing the operation of a syntax analysis unit.

The operation of detecting the beginning of a picture in a Dependent stream will be described with reference to a flowchart in FIG. 27.

Here, as illustrated in part B of FIG. 16, it is assumed that a Base stream and a Dependent stream constitute different bit streams and that the Dependent stream has an encoded DD.

In step S1, the start code detection unit 212 searches for a start code.

After a start code is detected, in step S2, the syntax analysis unit 213 checks whether or not nal_unit_type=18 is satisfied.

In a case where it is determined in step S2 that nal_unit_type=18 is satisfied, in step S3, the syntax analysis unit 213 detects that the NAL unit having the detected start code is a unit storing a DD and is at the beginning of a picture in the Dependent stream.

Figure 14:
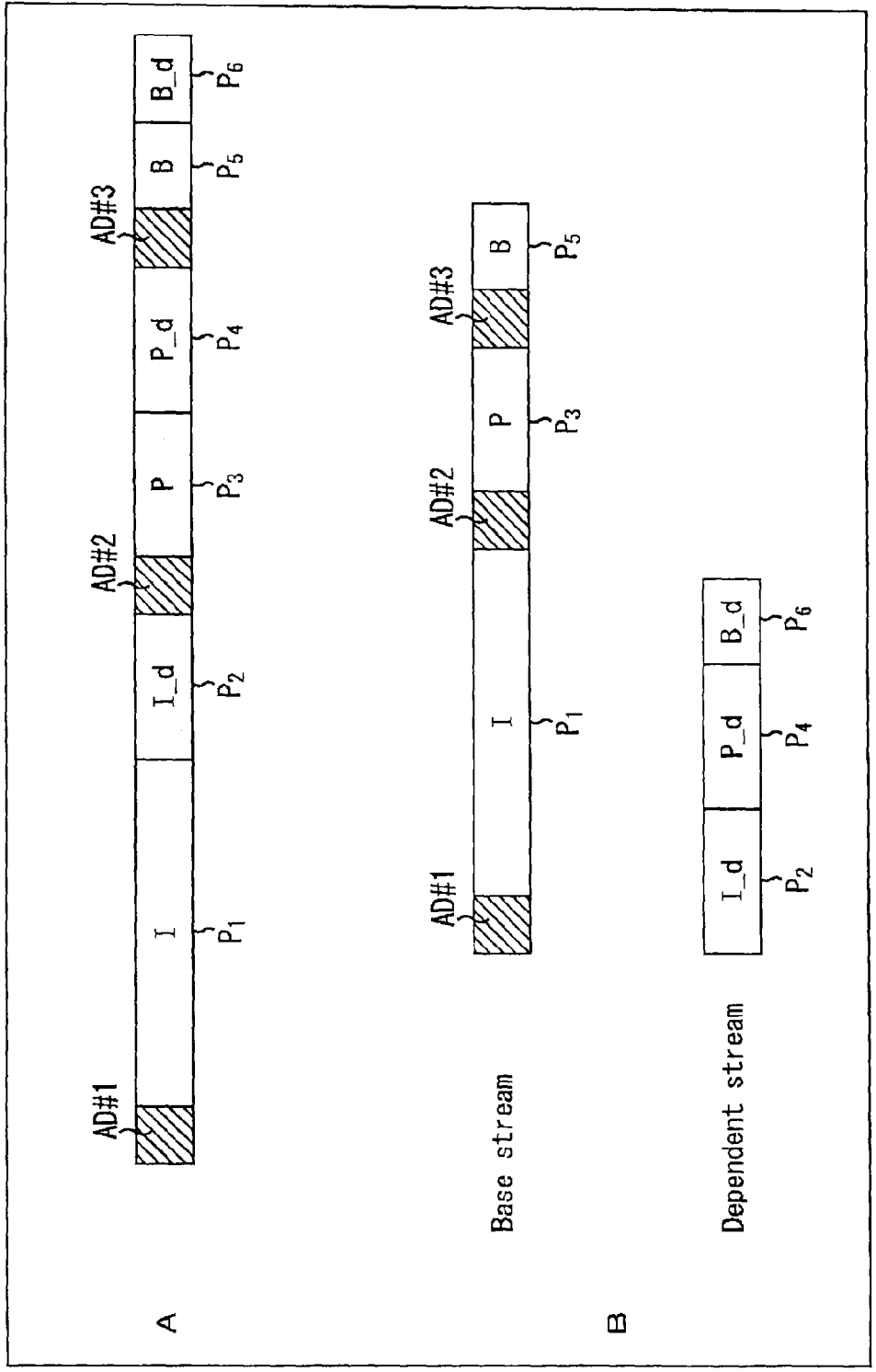
FIG. 14 includes diagrams illustrating an example of the structure of bit streams.
Figure 28:
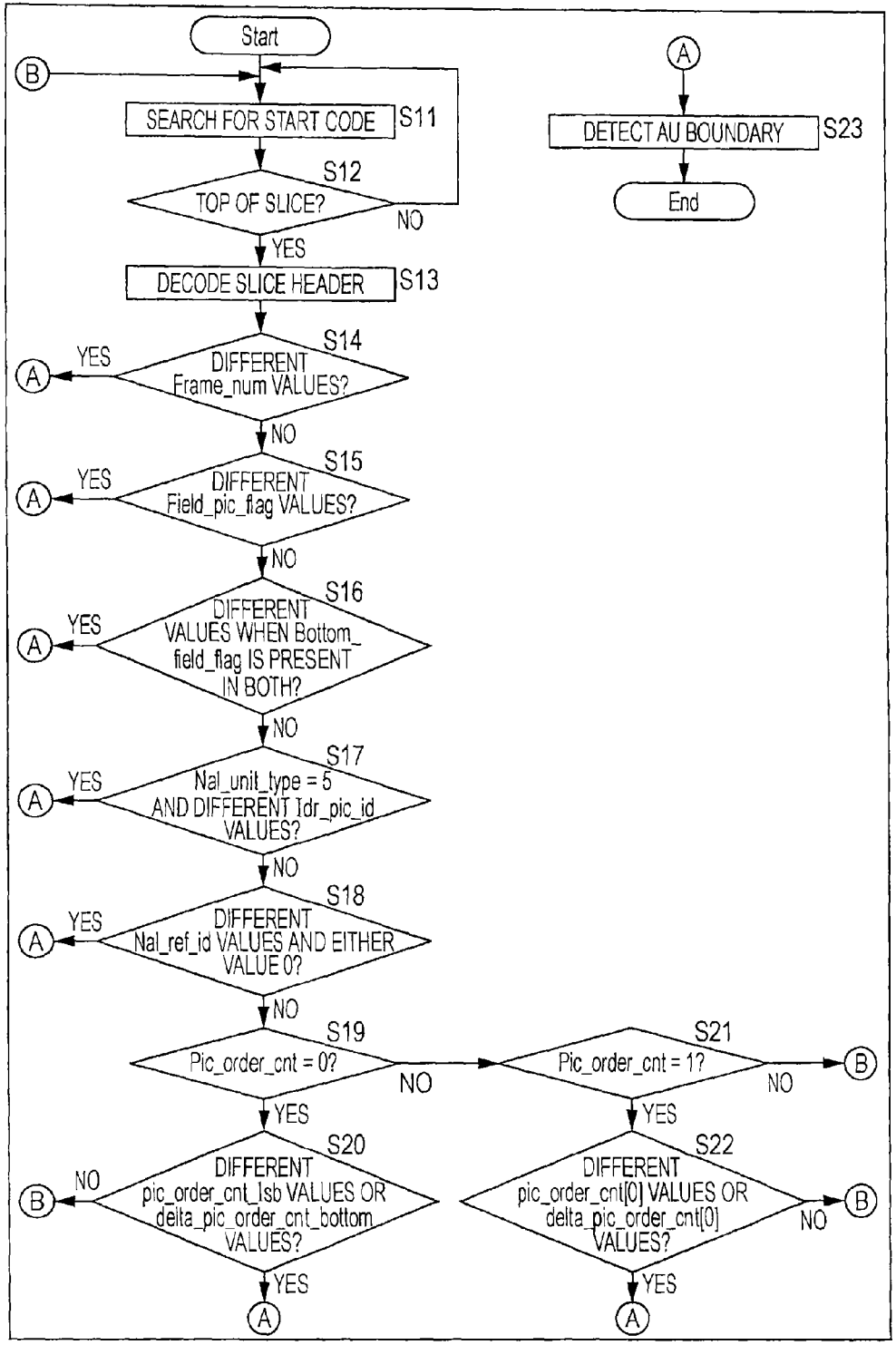
FIG. 28 is a flowchart describing a conventional analysis process.

The operation in a case where, as illustrated in part B of FIG. 14, the stream is composed of two bit storms and where, as in conventional MVC, the Dependent stream has no DDs is illustrated in FIG. 28.

As illustrated in FIG. 28, in a case where the Dependent stream has no DDs, slice headers are also decoded, and multiple conditional determinations are performed. Finally, in step S23, it is possible to detect the beginning of an AU (beginning of a picture).

In FIG. 28, the values used in the respective determinations up to step S23 are pieces of information written in slice headers stored in RBSPs (FIG. 17) of a NAL unit. Unlike nal_unit_type=18 described above, the above pieces of information are not written in headers of NAL units, and therefore, complicated analysis processing is performed.

[Three-Viewpoint Bit Stream]

Three-viewpoint bit streams will be described.

Figure 29:
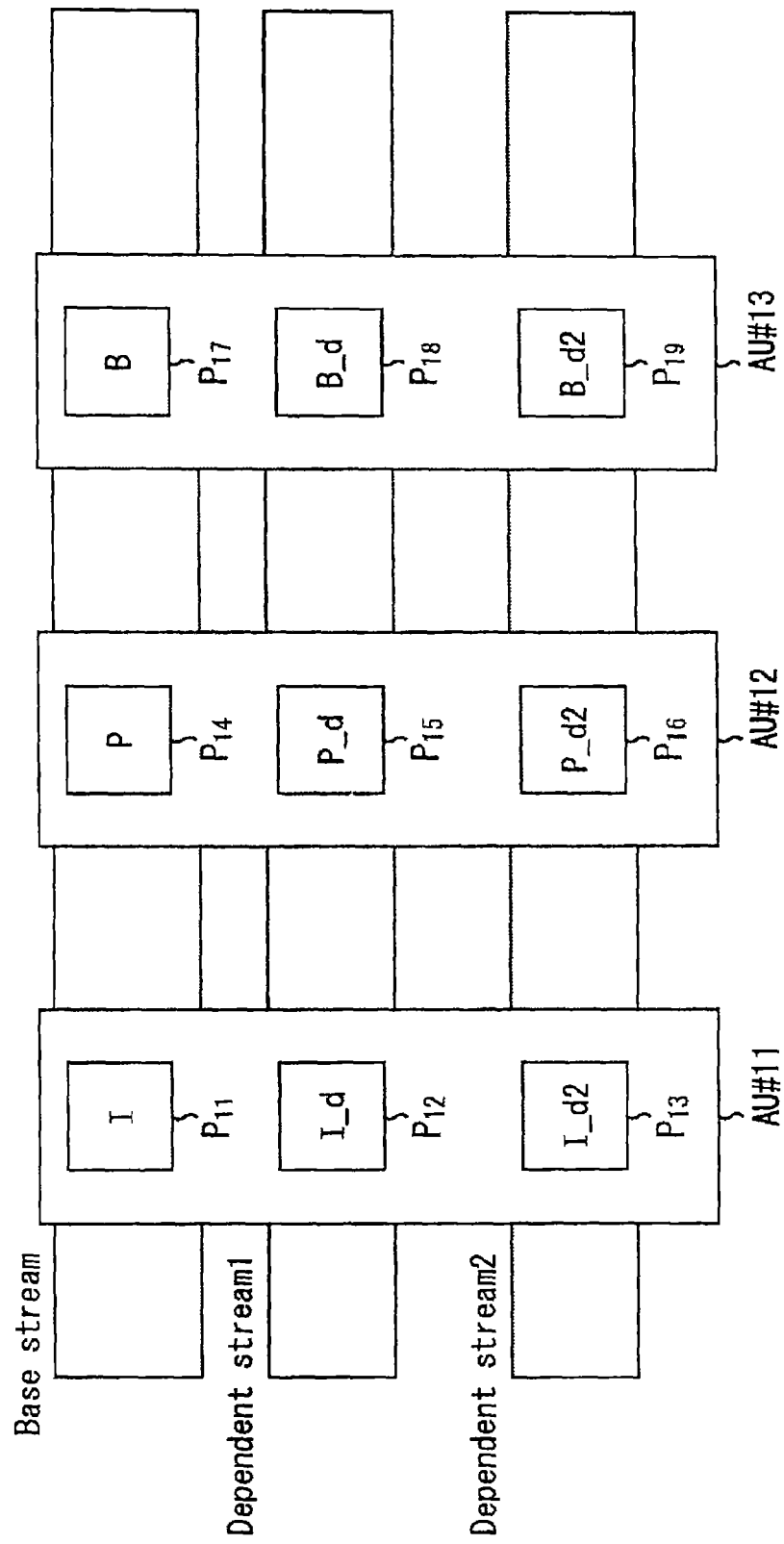
FIG. 29 is a diagram illustrating the configuration of AUs of bit streams obtained by encoding three-viewpoint video using MVC.

FIG. 29 is a diagram illustrating the configuration of AUs obtained by encoding three-viewpoint video using MVC.

As described above, in the case of MVC, one AU stores the data of all views obtained at the same time point. The same applies even in a case where the number of viewpoints is three.

In FIG. 29, AU #11 is composed of picture $P_{11}$ in a Base stream, picture $P_{12}$ in a Dependent stream 1, and picture $P_{13}$ in a Dependent stream 2.

AU #12 is composed of picture $P_{14}$ in the Base stream, picture $P_{15}$ in the Dependent stream 1, and picture $P_{16}$ in the Dependent stream 2.

AU #13 is composed of picture $P_{17}$ in the Base stream, picture $P_{18}$ in the Dependent stream 1, and picture $P_{19}$ in the Dependent stream 2.

Figure 30:
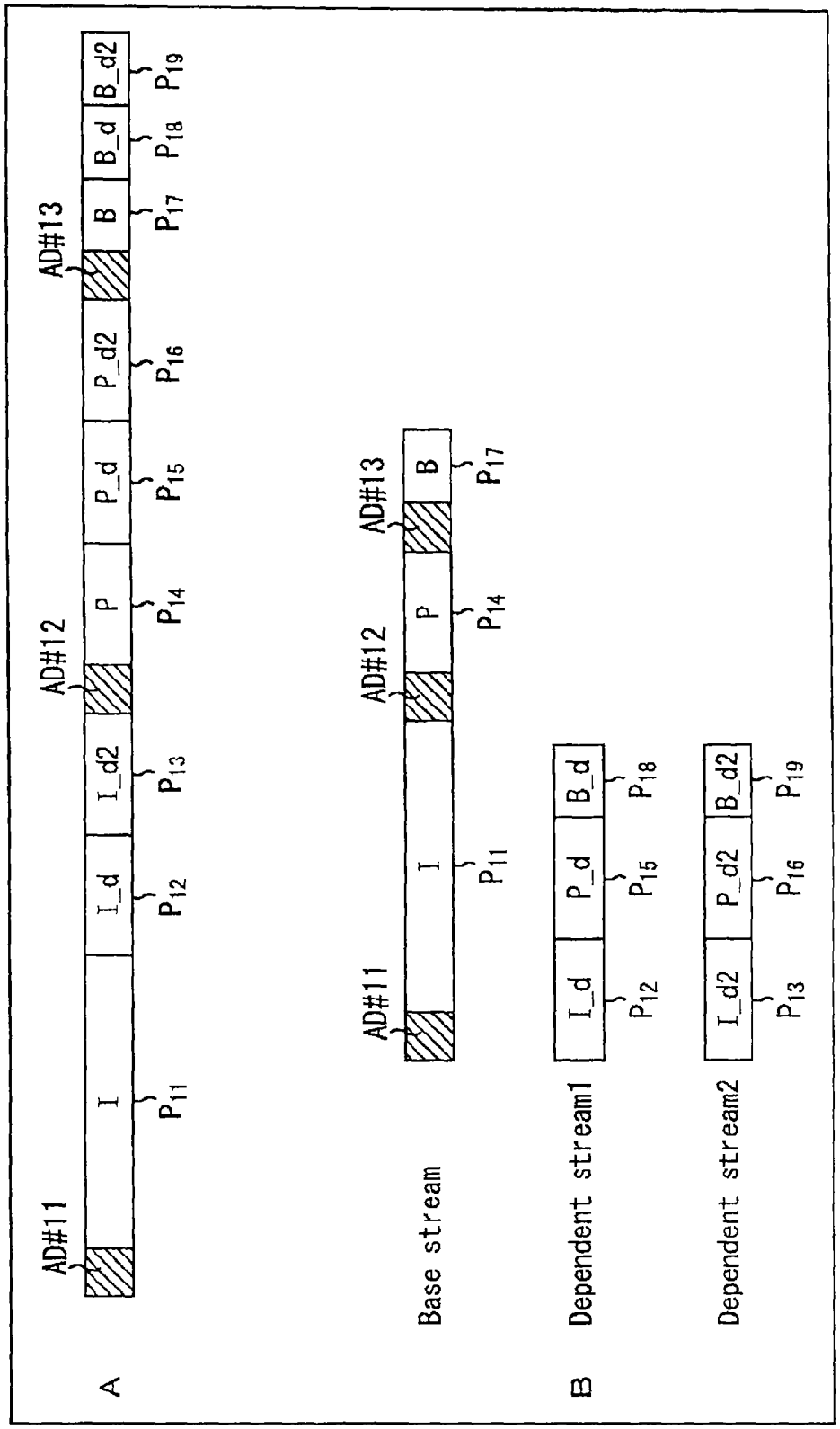
FIG. 30 includes diagrams illustrating an example of the structure of bit streams.

FIG. 30 includes diagrams illustrating an example of the structure of bit streams.

The bit streams illustrated in FIG. 30 include no DDs.

Part A of FIG. 30 illustrates an example of a structure in a case where the Base stream, the Dependent stream 1, and the Dependent stream 2 are multiplexed into a single bit stream.

Part B of FIG. 30 illustrates an example of a structure in a case where the Base stream, the Dependent stream 1, and the Dependent stream 2 are included in a total of three different bit streams. Portions corresponding to the portions illustrated in part A of FIG. 30 are assigned the same symbols.

For example, in a case where the bit stream in part A of FIG. 30 is supplied, after detecting the AD #11, the video decoding unit 152 sequentially reads the picture $P_{11}$ in the Base stream, the picture $P_{12}$ in the Dependent stream 1, and the picture $P_{13}$ in the Dependent stream 2, and individually decodes the pictures.

In addition, in a case where the bit streams in part B of FIG. 30 are supplied, for the first AU in the Base stream, the video decoding unit 152 detects the AD #11 and reads and decodes the picture $P_{11}$. In addition, the video decoding unit 152 detects, for the second AU, the AD #12 and reads and decodes the picture $P_{14}$.

The Dependent streams 1 and 2 have no DDs. Therefore, in order to read the individual pictures, the need exists to analyze the syntax in the bit streams in accordance with the process in FIG. 28 and to detect the boundaries of the pictures $P_{12}$, $P_{13}$, $P_{15}$, $P_{16}$, $P_{18}$, and $P_{19}$.

Figure 31:
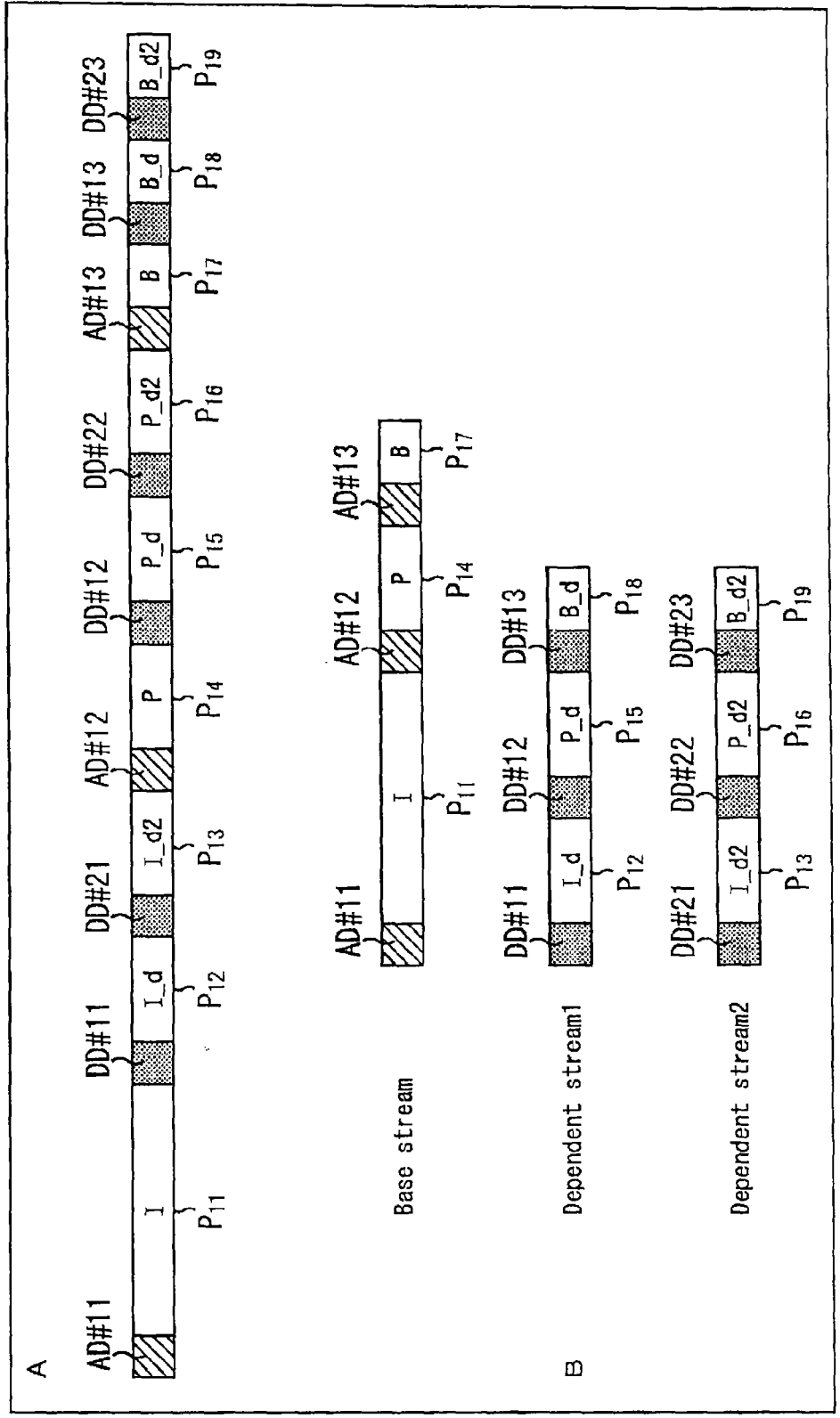
FIG. 31 includes diagrams illustrating an example of the structure of bit streams.

FIG. 31 includes diagrams illustrating an example of the structure of bit streams generated by a multi-viewpoint encoding apparatus 101 according to an embodiment of the present invention.

Part A of FIG. 31 illustrates an example of a structure in a case where the Base stream, the Dependent stream 1, and the Dependent stream 2 are multiplexed into a single bit stream.

Part B of FIG. 31 illustrates an example of a structure in a case where the Base stream, the Dependent stream 1, and the Dependent stream 2 are included in a total of three different bit streams.

In a case where the bit stream in part A of FIG. 31 is supplied, after detecting the AD #11, the video decoding unit 152 sequentially reads the picture $P_{11}$ in the Base stream, the picture $P_{12}$ in the Dependent stream 1, and the picture $P_{13}$ in the Dependent stream 2, and individually decodes the pictures.

In a case where the bit streams in part B of FIG. 31 are supplied, for the first AU in the Base stream, after detecting the AD #11, the video decoding unit 152 decodes the picture $P_{11}$. For the second AU, after detecting the AD #12, the video decoding unit 152 decodes the picture $P_{14}$.

In addition, for the Dependent stream 1, after detecting the DD #11, the video decoding unit 152 decodes the picture $P_{12}$. In addition, after detecting the DD #12, the video decoding unit 152 decodes the picture $P_{15}$.

Further, for the Dependent stream 2, after detecting the DD #21, the video decoding unit 152 decodes the picture $P_{13}$. In addition, after detecting the DD #22, the video decoding unit 152 decodes the picture $P_{16}$.

In this manner, in the multi-viewpoint decoding apparatus 101, an operation is performed so that a desired AU is detected and decoded in accordance with an AD that is a piece of information illustrating an AU boundary and a DD that is a piece of information illustrating a boundary between pictures in a Dependent stream and so that a stereoscopic image is displayed.

Since there is no need to analyze slice headers in the case of detecting the start position of a certain picture in a Dependent stream, high-speed random access is made feasible.

The series of processes described above can be executed by hardware or software. In a case where the series of processes is executed by software, a program constituting the software is installed from a program recording medium into a computer incorporated in dedicated hardware, a general-purpose personal computer, or the like.

Figure 32:
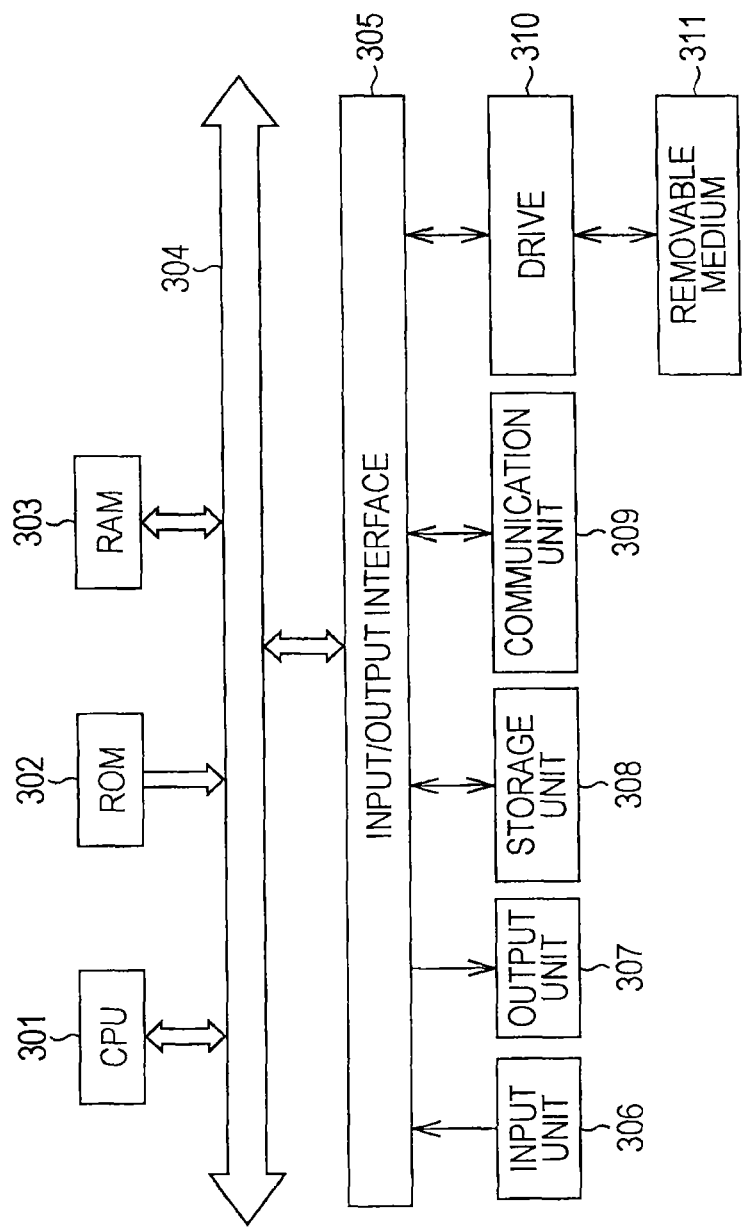
FIG. 32 is a block diagram illustrating an example configuration of a computer.

FIG. 32 is a block diagram illustrating an example configuration of hardware of a computer that executes the series of processes described above in accordance with a program.

A CPU (Central Processing Unit) 301, a ROM (Read Only Memory) 302, and a RAM (Random Access Memory) 303 are connected to one another via a bus 304.

An input/output interface 305 is further connected to the bus 304. An input unit 306 having a keyboard, a mouse, and the like and an output unit 307 having a display, speakers, and the like are connected to the input/output interface 305. In addition, a storage unit 308 having a hard disk, a non-volatile memory, and the like, a communication unit 309 having a network interface and the like, and a drive 310 that drives a removable medium 311 are connected to the bus 304.

In the computer configured as above, for example, the CPU 301 loads a program stored in the storage unit 308 into the RAM 303 via the input/output interface 305 and the bus 304, and executes the program. Thus, the series of processes described above is performed.

The program executed by the CPU 301 is recorded on, for example, the removable medium 311, or is provided via a wired or wireless transmission medium such as a local area network, the Internet, or digital broadcasting and is installed into the storage unit 308.

It is to be noted that the program executed by the computer may be a program in accordance with which the processes are performed in a time-series manner in the order described herein, or may be a program in accordance with which the processes are performed in parallel or at a required timing such as when called.

Embodiments of the present invention are not to be limited to the embodiment described above, and a variety of changes can be made without departing from the scope of the present invention.

Reference Signs List 41 multi-viewpoint encoding apparatus, 51 rearrangement buffer, 52 video encoding unit, 53 frame memory, 54 rearrangement buffer, 55 dependent stream encoding unit, 56 frame memory, 57 multiplexing unit, 101 multi-viewpoint decoding apparatus, 102 3D display, 111 buffer, 112 video decoding unit, 113 frame memory, 114 buffer, 115 dependent stream decoding unit, 116 frame memory, 201 DD encoding unit

The invention claimed is:

1. A decoding method for decoding a base stream generated by encoding a first image signal of a first view and a dependent stream generated by encoding a second image signal of a second view, the method comprising:
    detecting, on the basis of a dependent delimiter indicating a picture boundary between pictures in the dependent stream, the picture boundary in the dependent stream configured by inserting the dependent delimiter at the beginning of a picture in the dependent stream, the dependent delimiter being a Network Abstraction Layer (NAL) unit including nal_unit_type with a value which is different from a nal_unit_type of an access unit delimiter inserted at a start position of an access unit; and
    decoding, via processing circuitry, the dependent stream on the basis of the detected picture boundary in the dependent stream.

2. A decoding apparatus for decoding a base stream generated by encoding a first image signal of a first view and a dependent stream generated by encoding a second image signal of a second view, the apparatus comprising:
    means for detecting, on the basis of a dependent delimiter indicating a picture boundary between pictures in the dependent stream, the picture boundary in the dependent stream configured by inserting the dependent delimiter at the beginning of a picture in the dependent stream, the dependent delimiter being a Network Abstraction Layer (NAL) unit including nal_unit_type with a value which is different from a nal_unit_type of an access unit delimiter inserted at a start position of an access unit; and
    means for decoding the dependent stream on the basis of the detected picture boundary in the dependent stream.

3. A decoding apparatus for decoding a base stream generated by encoding a first image signal of a first view and a dependent stream generated by encoding a second image signal of a second view, the apparatus comprising:
    processing circuitry configured
    to detect, on the basis of a dependent delimiter indicating a picture boundary between pictures in the dependent stream, the picture boundary in the dependent stream configured by inserting the dependent delimiter at the beginning of a picture in the dependent stream, the dependent delimiter being a Network Abstraction Layer (NAL) unit including nal_unit_type with a value which is different from a nal_unit type of an access unit delimiter inserted at a start position of an access unit, and
    to decode the dependent stream on the basis of the detected picture boundary in the dependent stream.

* * * * *